(12) United States Patent
Iwanabe et al.

(10) Patent No.: US 8,400,887 B2
(45) Date of Patent: Mar. 19, 2013

(54) MAGNETIC RECORDING SYSTEM USED THERMAL-ASSISTED-MAGNETIC-RECORDING HEAD

(75) Inventors: Yasuhiko Iwanabe, Kodaira (JP);
Harukazu Miyamoto, Higashimurayama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/404,024

(22) Filed: Feb. 24, 2012

(65) Prior Publication Data
US 2012/0327751 A1 Dec. 27, 2012

(30) Foreign Application Priority Data
Jun. 23, 2011 (JP) .................................. 2011-139424

(51) Int. Cl.
*G11B 11/00* (2006.01)
(52) U.S. Cl. ............... 369/13.33; 369/13.13; 369/112.27
(58) Field of Classification Search ............... 369/13.33, 369/13.32, 13.24, 13.14, 13.03, 13.02, 112.27, 369/13.17, 13.12, 13.13, 13.01; 360/125.31, 360/125.74, 128, 59
See application file for complete search history.

(56) References Cited

U.S. PATENT DOCUMENTS

| | | | |
|---|---|---|---|
| 5,787,106 A | 7/1998 | Tabuchi et al. | |
| 6,987,913 B2 * | 1/2006 | Blauvelt et al. | 385/50 |
| 8,023,228 B2 * | 9/2011 | Sohn et al. | 360/128 |
| 2011/0090770 A1 | 4/2011 | Iwanabe et al. | |
| 2012/0182842 A1 * | 7/2012 | Iwanabe et al. | 369/13.17 |

FOREIGN PATENT DOCUMENTS

| | | |
|---|---|---|
| JP | 8-330673 | 12/1996 |
| JP | 2007-257753 | 10/2007 |
| JP | 2011-86338 | 4/2011 |
| JP | 2012-9113 | 1/2012 |

OTHER PUBLICATIONS

Tim Rausch et al., Near Field Heat Assisted Magnetic Recording with a Planar Solid Immersion Lens, Japanese Journal of Applied Physics, 2006, pp. 1314-1320, vol. 45, No. 2B.
Vilson R. Almeida et al., Naotaper for compact mode conversion, Optics Letters, Aug. 1, 2003, pp. 1302-1304, vol. 28, No. 15.

* cited by examiner

*Primary Examiner* — Ali Neyzari
(74) *Attorney, Agent, or Firm* — Antonelli, Terry, Stout & Kraus, LLP.

(57) ABSTRACT

A thermally assisted recording magnetic head is provided in which a magnetic recording medium can be irradiated with light having a spot size reduced in the submicron order with high total optical propagation efficiency. In a magnetic head, a spot size converter that propagates the light from an optical source in the magnetic head is provided adjacent to a main pole. The spot size converter includes a cover layer having a refractive index lower than that of a clad material and formed in contact with the optical waveguide core, and is formed in a shape composed of a substantially rectangular shape in a light traveling direction and a tapered shape where the width is increased toward the bottom surface of the magnetic head. The optical waveguide core having the cover layer formed is vertically interposed between multi-mode-thin-film-like cores that can excite a first or higher-order optical waveguide mode.

13 Claims, 15 Drawing Sheets

MAGNETIC RECORDING SYSTEM USED THERMAL-ASSISTED-MAGNETIC-RECORDING HEAD

CLAIM OF PRIORITY

The present application claims priority from Japanese patent application JP 2011-139424 filed on Jun. 23, 2011, the content of which is hereby incorporated by reference into this application.

BACKGROUND OF THE INVENTION

1. Field of the Invention

The present invention relates to a thermally assisted recording magnetic head and a magnetic recording apparatus including the same.

2. Description of the Related Art

The information recording density of magnetic recording apparatuses has been increasing steadily, and the size of a magnetic recording mark per bit has been becoming smaller and smaller. So far, the recording bit size in the magnetic recording apparatus has been mainly reduced by reducing the size of a recording magnetic head and magnetic particles used for a magnetic recording medium. However, since the magnetic recording density exceeded 1 Tbit/inch$^2$, there has been a concern that the magnetic information recorded on the magnetic recording medium may be lost at room temperature due to an influence of thermal fluctuation. To prevent this, a magnetic coercive force of the magnetic recording medium needs to be increased. Unfortunately, the magnitude of the magnetic field that can be generated by the magnetic recording head is limited. If the magnetic coercive force is excessively increased, the recording bit cannot be formed in the medium. In order to solve this, a thermally assisted magnetic recording method has received attention these days in which at an instant of recording, the medium is heated to reduce the magnetic coercive force of the medium, thereby enabling recording on a highly coercive medium. As the thermally assisted magnetic recording method, a method for achieving a high recording density has been heretofore proposed in which a fine light spot with high power density is outputted to a medium to locally heat only a recording region.

Usually, a lens is used to produce the fine light spot. Recently, the distance between the magnetic head and the magnetic recording medium is not more than 10 nm. If a magnetic head is increased in weight due to an optical element such as the lens mounted on the magnetic head, the weight causes problems such as bringing a magnetic recording head into contact with the magnetic recording medium, or hindering air-bearing of the head. Moreover, a plurality of magnetic recording media (disks) are stacked in the magnetic recording apparatus, and an interval between the magnetic recording media is usually not more than 1 mm. For this reason, all the parts provided around the magnetic head have to be accommodated within the height of not more than 1 mm. Accordingly, it is not preferable that the optical element such as the lens be mounted on the magnetic head.

In this regard, in one of method proposed as a method for producing a fine light spot on a magnetic recording medium without using a lens or the like, an optical waveguide including a core and a clad is formed. This method can be implemented by forming a core, by using a material with a large refractive index difference delta-n from the clad, the core having a width and a thickness in the submicron order.

RELATED DOCUMENTS

Patent Documents

[Patent Document 1] JP 2007-257753 A
[Patent Document 2] JP 08-330673 A

Non-Patent Documents

[Non-Patent Document 1] Japanese Journal of Applied Physics, Vol. 45, No. 2B, 2006, pp. 1314-1320
[Non-Patent Document 2] Optics Letters, Vol. 28, No. 15, 2003, pp. 1302-1304

SUMMARY OF THE INVENTION

In the magnetic recording apparatus using the thermally assisted magnetic recording method, the spot size of the light emitted from an optical source and entering the optical waveguide is large in the order of several to several dozen micrometers. For this reason, in the case where the light directly enters the core having the width and the thickness in the submicron order, total optical propagation efficiency is low due to a large coupling loss of the light undesirably. This requires increase in the output light power of the optical source for implementing the thermally assisted magnetic recording, and results in increase in the power consumption in the whole magnetic recording apparatus and increase in the temperature within the apparatus. Particularly, increase in the temperature leads to reduction in performance of the magnetic recording apparatus.

Accordingly, an optical waveguide that can be efficiently coupled to the light having a large spot size to convert the light into a smaller light spot without loss of the light needs to be formed within the magnetic head. As the optical waveguide that can convert the spot size of the light (hereinafter, referred to as a spot size converter), Non-Patent Document 2 uses an optical waveguide (hereinafter, referred to as a tapered core) including a core having a size of several dozen nm, made of a high-refractive-index material and formed in a tapered shape that becomes thicker in the propagation direction of the light. This optical waveguide is coupled to the light having a relatively large spot size, and reduces the spot size in the submicron order while propagating the light within the optical waveguide.

FIG. 2 is a drawing schematically showing a typical example of a tapered core and change in a light intensity profile 26 of the light that propagates in the tapered core. As shown in FIG. 2, the spot size of the light is reduced as the light propagates along a tapered optical waveguide core 14 from an upper portion having a smaller core width toward a lower portion having a larger core width. FIG. 3 is a drawing for describing a principle of reducing the spot size by the tapered core. In FIG. 3, the horizontal axis indicates a cross section area of the core, and the vertical axis indicates the spot size of the light that can propagate in the core. In Non-Patent Document 2, the spot size is converted using a region in which the light propagates while the light greatly seeps from the core (a region in FIG. 3 written as a seeping mode). For example, the tapered core has a tip end (where the cross section area of the core is small) at P1 in FIG. 3, and is formed in a tapered shape in which the thickness is increased to have a large cross section area at P2 in FIG. 3. With this structure, the spot size of light is reduced when the light reaches P2 in FIG. 3. In Patent Document 1, an optical waveguide in combination of the tapered core and a rectangular optical waveguide is formed within a magnetic head.

In any of the spot size converters above, the size of the tip end of the tapered core has to be several dozen nm or smaller in order to efficiently couple to the light having a light spot size of several to several dozen micrometers. Considering accuracy and variations in processing, products using such a small core tip end are difficult to manufacture. Apparently from FIG. 3, if the difference delta-n in a refractive index between the core and the clad is reduced, the size of the tip end can be increased, but the spot size of the light that can be finally reduced is undesirably large. Accordingly, the tapered core having a small value of delta-n is not suitable for a thermally assisted recording magnetic head for emitting a fine light spot on a magnetic recording medium. In Patent Document 2, a material having a refractive index lower than that of the clad and called a transmission constant reduction enhancing layer is interposed between the core and the clad. Thereby, a spot size converter is configured without reducing delta-n. The spot size converter in Patent Document 2 aims at enlarging the spot size without consideration of any coupling of a portion configured to enlarge a spot size to light having a large spot size of several to several dozen micrometers (the light having a spherical wavefront).

Non-Patent Document 1 uses an optical waveguide called a planer solid immersion mirror in which the width of the core is reduced in an arc shape in the propagation direction of the light. Since grating is used for coupling of the incident light to optical waveguide, there is a concern about a light propagation loss of the incident light due to deviation of the light axis of the incident light.

An object of the present invention is to provide a mechanism capable of irradiating a magnetic recording medium with light having a spot size reduced to the submicron order with high total optical propagation efficiency by a spot size converter formed within a magnetic recording head in a magnetic recording apparatus in which a small and light-weight optical element is mounted on a magnetic head.

In order to achieve the object above, the present invention provides a magnetic head provided with an optical source above an upper surface of the magnetic head and including a spot size converter including a plurality of multi-mode-thin-film-like cores each capable of exciting a first or higher-order optical waveguide mode, an optical waveguide core made of a material having a refractive index larger than that of the multi-mode-thin-film-like core, and a cover layer made of a material having a refractive index lower than that of a clad material. Here, the upper surface of the magnetic head is a surface opposite to a surface forming an air bearing surface (ABS) of the magnetic head.

In the spot size converter, the cover layer is formed in contact with the optical waveguide core made of a high-refractive-index material, and the optical waveguide core having the cover layer formed is vertically interposed between the multi-mode-thin-film-like cores.

In the spot size converter, the thickness of the multi-mode-thin-film-like core is set to be not larger than a thickness that induces a seeping mode and the width core and the refractive index of the multi-mode-thin-film-like core are adjusted such that the multi-mode-thin-film-like core can excite a first or higher-order optical waveguide mode. Thereby, the spot size of the light that can be coupled to the multi-mode-thin-film-like core and propagate in the multi-mode-thin-film-like core can be increased. As a result, the magnetic head can be coupled to the light having a large spot size and emitted from the optical source provided on the upper surface of the magnetic head with high efficiency, and can propagate the light toward the bottom surface of the magnetic head.

The optical waveguide core has a shape composed of a substantially rectangular shape (hereinafter, referred to as a rectangular portion) and a tapered shape following the rectangular portion and having a width increasing toward the bottom of the magnetic head (hereinafter, referred to as a tapered portion). One or both of the width and thickness of the tip end of the rectangular portion in the core are set to be not more than those that induce the seeping mode, and the optical waveguide core is interposed between cover layers. By adjusting the tip end of the rectangular portion in the core as described above, a difference delta-n in refractive index between the core and the clad can be effectively reduced. For this reason, the spot size of the light that can be coupled to the tip end and propagate in the tip end can be increased. As a result, the optical waveguide core can be efficiently coupled to the light that propagates in the multi-mode-thin-film-like core.

Here, to efficiently convert the spot size of the light, the wavefront of the light to be subjected to size-conversion needs to be as flat as possible. In the spot size converter, the light is propagated in the rectangular portion in which the cover layer made of a material having a refractive index lower than that of the optical waveguide core and that of the clad material is formed between the optical waveguide core made of a high-refractive-index material and the clad material. Thereby, the wavefront can be made flat.

The tapered portion in the optical waveguide core made of a high-refractive-index material has a function to reduce the spot size of the light. The spot size can be reduced as the light propagates in the tapered portion. For this reason, the light of the spot size in the nanometer order can be emitted from the bottom surface of the magnetic head. Moreover, the wavefront of the light coupled to the tapered portion is made flat in the rectangular portion. For this reason, the spot size of the light can be reduced in the tapered portion with high total optical propagation efficiency.

Moreover, in order to further improve the total optical propagation efficiency of the spot size converter, the distance between the multi-mode-thin-film-like core and the optical waveguide core made of a high-refractive-index material may be in the range of a half of a half width of the spot size in the thickness direction of the light that propagates along the multi-mode-thin-film-like core±40%. If the distance is thus adjusted, while highly efficient light coupling of the light of a large spot size emitted from the optical source provided on the upper surface of the magnetic head and the multi-mode-thin-film-like core is maintained, the light that propagates through the multi-mode-thin-film-like core can be coupled to the optical waveguide core made of a high-refractive-index material with high efficiency. For this reason, the total optical propagation efficiency of the spot size converter can be improved.

Moreover, in order to further improve the total optical propagation efficiency of the spot size converter, the number of the multi-mode-thin-film-like cores may be 2 to 6, both inclusive; and as the multi-mode-thin-film-like core is away from the optical waveguide core, one or both of the width and thickness of the multi-mode-thin-film-like core may be smaller or the refractive index may be lower. Thereby, in the case where the spot size of the light entering the spot size converter is larger, the respective multi-mode-thin-film-like cores can be coupled to the incident light, and the light coupled to the multi-mode-thin-film-like core can be coupled to the optical waveguide core efficiently. As a result, the total optical propagation efficiency of the spot size converter can be improved.

According to the present invention, a thermally assisted recording magnetic head can be provided in which a magnetic recording medium can be irradiated with light having a spot size reduced in the submicron order with high total optical propagation efficiency. Moreover, a magnetic recording apparatus having a large volume and a high recording density can be implemented.

Problems, configurations, and effects other than those described above will be clarified by description of embodiments below.

DESCRIPTION OF THE PREFERRED EMBODIMENTS

Hereinafter, with reference to the drawings, embodiments according to the present invention will be described.

Figure 1:
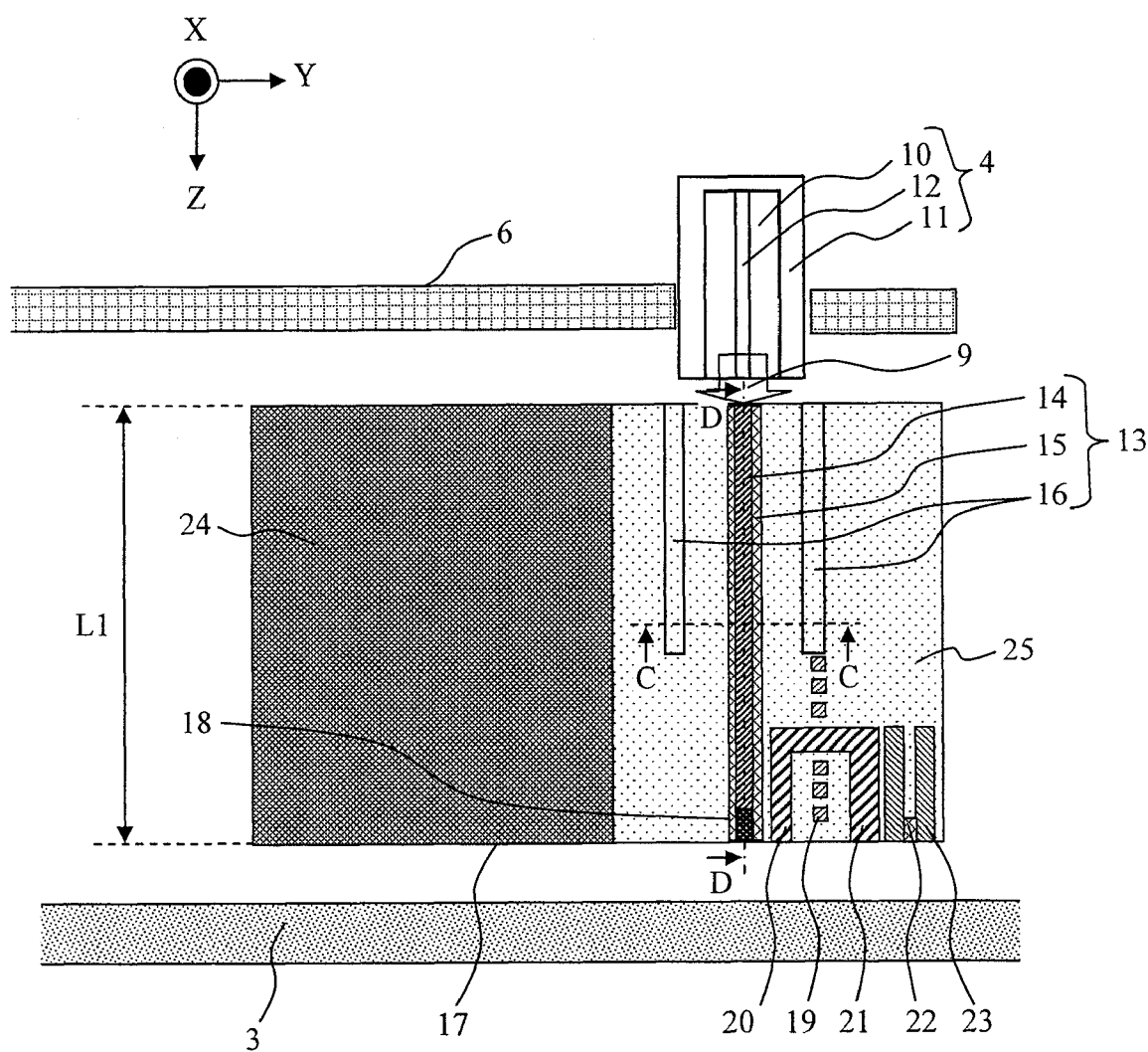
FIG. 1 is a cross-sectional schematic view in the vicinity of a magnetic head having a spot size converter according to the present invention.
Figure 2:
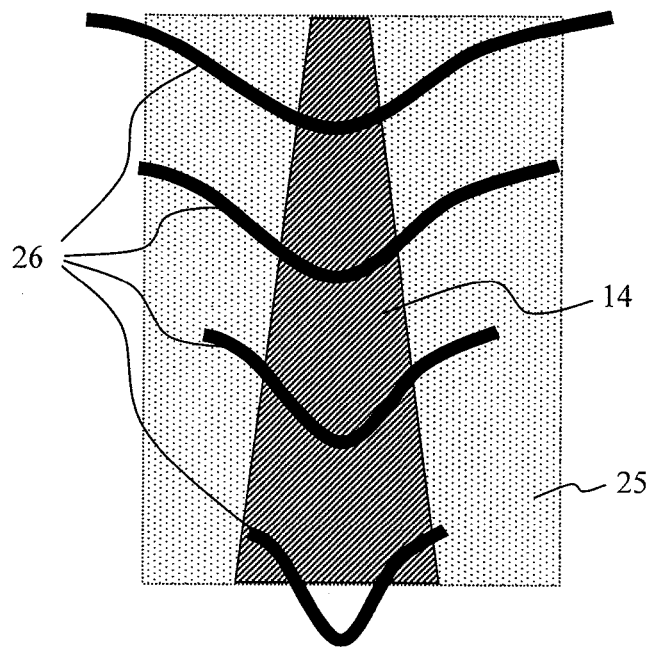
FIG. 2 is a schematic view showing change in light intensity profile that propagates through a tapered core.
Figure 3:
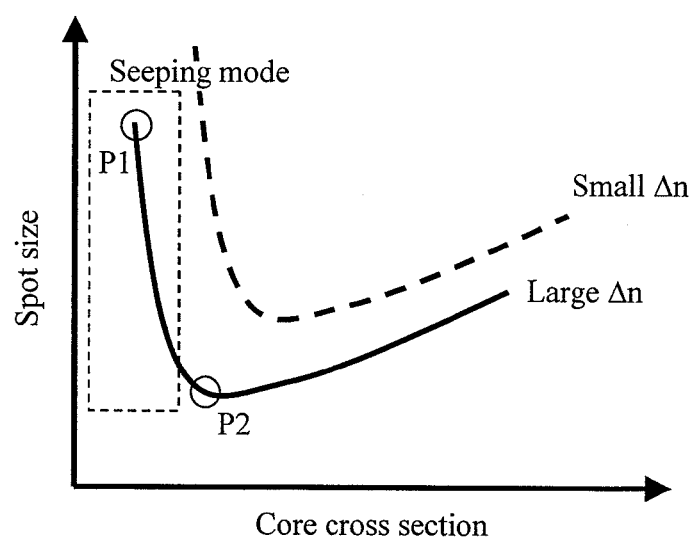
FIG. 3 is a drawing for describing a principle of reduction in a spot size by a tapered core.
Figure 4:
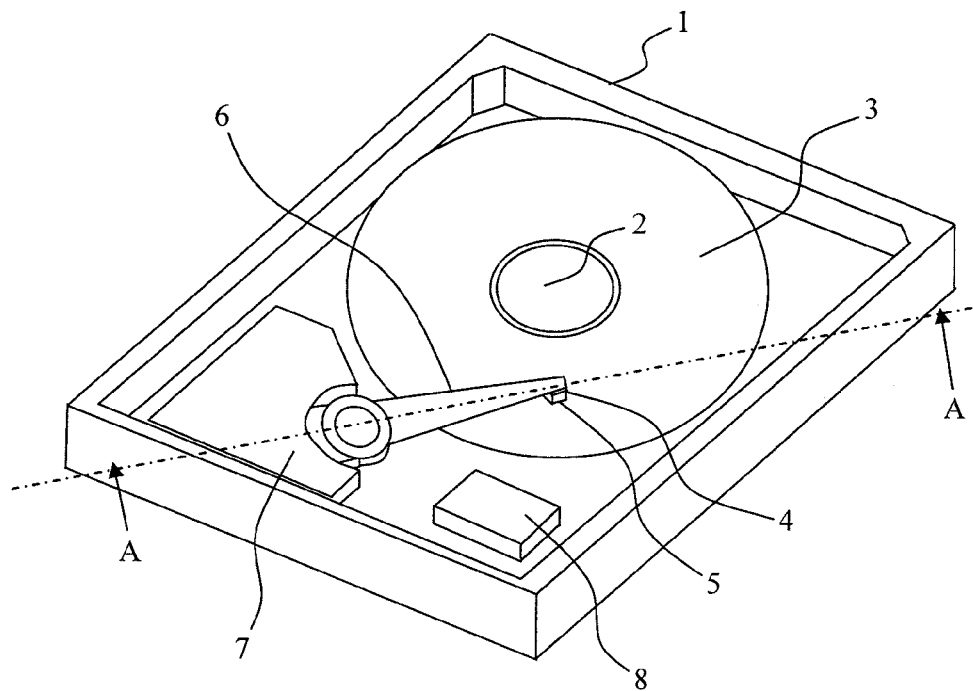
FIG. 4 is a schematic view showing an essential part of a magnetic recording apparatus.
Figure 5:
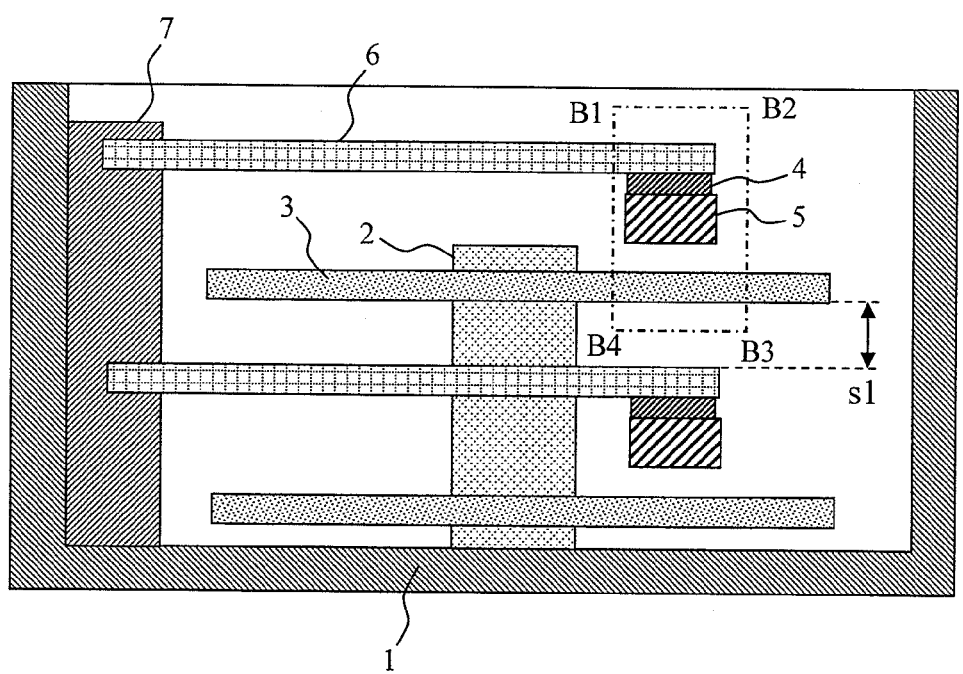
FIG. 5 is a cross-sectional schematic view taken along A-A in FIG. 4.

Using FIG. 4, FIG. 5, and FIG. 1, an embodiment of information recording apparatus according to the present invention having a high efficient light integration mechanism will be described. FIG. 4 is a schematic view showing an essential part of a magnetic recording apparatus according to the embodiment in which a cover of a casing 1 is removed. FIG. 5 is a cross-sectional schematic view taken along A-A in FIG. 4. FIG. 1 is a schematic view of a cross section of a magnetic head around the spot size converter according to the present invention, and is an enlarged view of a region of B1-B2-B3-B4 in FIG. 5.

As shown in FIG. 4, a magnetic recording medium 3 is fixed to a spindle 2 rotated and driven by a motor, and rotated. A magnetic head 5 is fixed to a suspension 6, and moved by a voice coil motor 7 to be positioned at a desired track in the magnetic recording medium 3. As shown in FIG. 1, an ABS (Air Bearing Surface) is formed on the bottom surface 17 of the magnetic head. Thereby, at the time of rotating the magnetic recording medium 3, negative pressure is produced between the magnetic recording medium 3 and the bottom surface 17 of the magnetic head to lift the magnetic head above the magnetic recording medium 3 at an air bearing amount of not more than 10 nm.

As shown in FIG. 5, within the casing 1, at least one magnetic recording medium 3 fixed to the spindle 2, and the at least one suspension 6 fixed to the voice coil motor 7 are provided. A distance s1 between the suspension 6 and an upper stage of the magnetic recording medium 3 is not longer than 1 mm. Each of the suspensions 6 is provided with an optical source 4 that emits light needed at the time of thermally assisted magnetic recording and the magnetic head 5, and the optical source 4 is provided between the suspension 6 and the magnetic head 5. If the optical source 4 is provided in this way, heat generated in the optical source 4 can be dissipated via the magnetic head 5 to the magnetic recording medium 3 side when the magnetic head 5 is lifted, enabling stable driving of the optical source.

Further, as shown in a sectional view around the magnetic head in FIG. 1, a spot size converter 13 that can propagate the light while the spot size thereof is reduced is formed within the magnetic head. A length L1 of the magnetic head is 180 micrometers or 230 micrometers, and AlTiC is used for a magnetic head base material 24. As the optical source 4, a semiconductor laser 10 is used, which is provided in a submount 11 to produce the light at a wavelength of 760±20 nm or wavelength of 830±20 nm in a single mode. An active layer 12 of the semiconductor laser 10 is disposed substantially vertical to the top surface of the magnetic head 5. Thereby, the light can enter the spot size converter 13.

The space between the semiconductor laser 10 and the top surface of the magnetic head 5 may be filled with a material that hardly absorbs the light and has a refractive index larger than that of the air (refractive index >1). Thereby, expansion of the spot size of the light emitted from the semiconductor laser 10 can be suppressed. As the material filled into the space between the semiconductor laser 10 and the top surface of the magnetic head 5, UV curable resins and thermosetting adhesives usually used for adhesion of optical parts may be used. This is because these can suppress expansion of the spot size but also can function as an adhesive to apply the submount 11 to the magnetic head.

The light emitted from the optical source 4 (incident light 9) propagates in the spot size converter 13, is guided to the bottom surface 17 of the magnetic head while the spot size thereof is reduced, and emitted to the magnetic recording medium 3. An optical near-field transducer 18 that can generate a fine light spot may be formed in a termination of the spot size converter 13. As the optical near-field transducer 18, a metallic scatterer whose shape viewed from the bottom surface 17 of the magnetic head is triangular (Optics Letters, Vol. 31, No. 15, Jan. 15, 2006, page 259) may be used. In order to prevent the magnetic recording medium 3 to be irradiated with background light that exists around the optical near-field transducer 18, a light shielding film may be formed around the optical near-field transducer 18. Further, as the optical near-field transducer 18, those having a V-shaped opening (Japanese Unexamined Patent Application Publication No. 2001-255254) or those having a C-shaped opening (optics Letters, Vol. 28, No. 15, Aug. 1, 2003, page 1320), in which part of the metallic scatterer is connected to the light shielding film, may be used.

The magnetic field needed at the time of recording is generated using a thin film coil 19 formed within the magnetic head, and the generated magnetic field is guided to the termination of the spot size converter by a main pole 20. The distance between the main pole 20 and the spot size converter 13 is not more than 200 nm. On the side opposite to the thin film coil 19, an auxiliary magnetic pole 21 for forming a closed magnetic path is formed. Next to the auxiliary magnetic pole 21, a GMR (Giant Magneto Resistive) element or a TMR (Tunneling Magneto Resistive) element is formed a magnetic reproducing element 22 for recording a recording mark. Around the magnetic read element 22, a shield 23 for shielding the magnetic field from surroundings is formed.

Next, a recording and reproducing method using the magnetic recording apparatus will be described. In the state where the magnetic recording medium 3 is rotated, the magnetic field is generated by the thin film coil 19 provided in the magnetic head 5 at an instant of recording. Simultaneously, the light is emitted from the semiconductor laser 10 to form the magnetic recording mark on the magnetic recording medium 3. At the instant when the semiconductor laser 10 emits the light emission, the light that has propagated through the spot size converter 13 is emitted to the magnetic recording medium 3 to heat the medium. Thus, the thermally assisted magnetic recording is realized. The thermally assisted magnetic recording essentially depends on the temperature of the magnetic recording medium. Accordingly, the timing when the magnetic field is generated is not always the same as the timing when the light is emitted from the optical source 4. For example, the light may be emitted from the optical source 4 to heat the magnetic recording medium 3, and the magnetic field may be produced. Moreover, the light is continuously emitted to the magnetic recording medium 3, and a magnetic field in which the information to be recorded is modulated into a magnetic field pulse is applied. Thereby, the magnetic information can be recorded on the magnetic recording medium 3. Further, the magnetic field is continuously applied, and the light in which the information to be recorded is modulated into a light pulse is emitted. Thereby, the magnetic information can be recorded on the magnetic recording medium 3. For reproduction of a magnetic recording mark, the magnetic reproducing element 22 formed in the magnetic head shown in FIG. 1 is used. A reproduce signal is processed by an LSI 8 for signal processing shown in FIG. 4.

Next, using FIG. 1 and FIG. 6 to FIG. 15, the spot size converter formed within the magnetic head will be described in detail. In the schematic view of the cross section in FIG. 1, the state around the magnetic head including the spot size converter 13 is shown. The spot size converter 13 is covered with a clad material 25. The spot size converter 13 has a function to be directly coupled to the light emitted from the optical source 4 (incident light 9) to propagate the light to the bottom surface 17 of the magnetic head, and a function to emit light of the fine spot size to the magnetic recording medium 3. For this, the spot size converter 13 is extended from the upper surface of the magnetic head to the direction of the bottom surface 17 of the magnetic head. Here, the bottom surface 17 of the magnetic head refers to the surface on which the ABS of the magnetic head is formed.

Figure 6A:
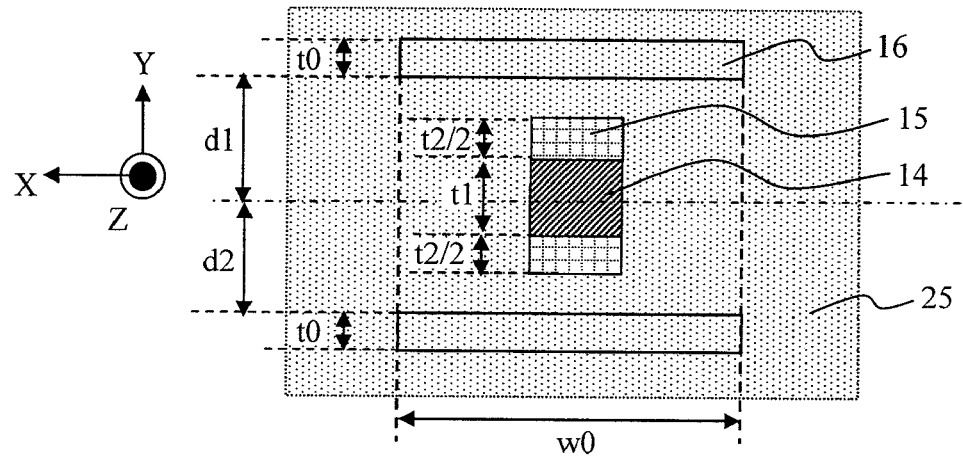
FIG. 6A is a cross-sectional schematic view taken along C-C in FIG. 1.
Figure 6B:
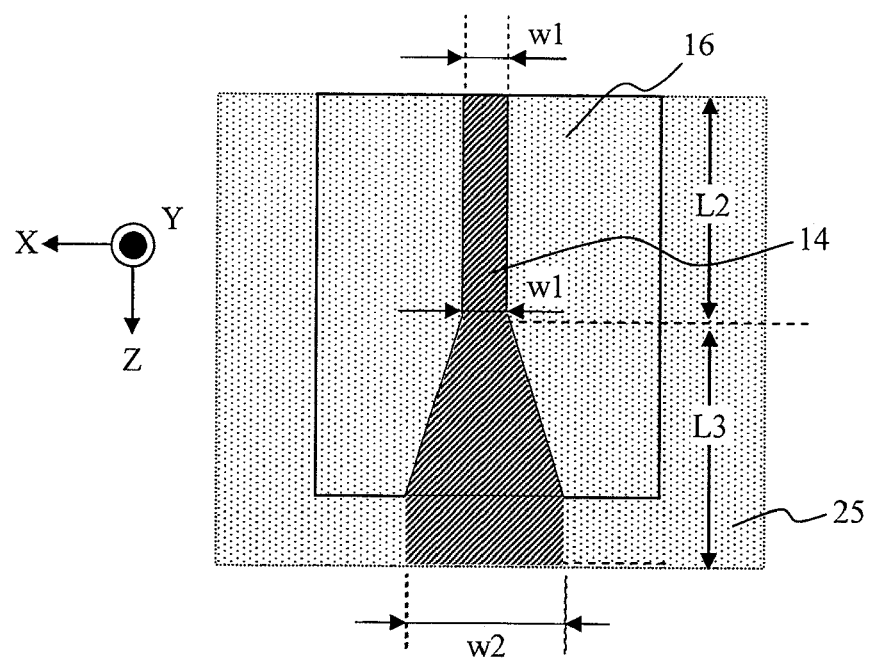
FIG. 6B is a cross-sectional schematic view taken along D-D in FIG. 1.

FIG. 6A is a schematic view of a cross section taken along C-C in FIG. 1, and FIG. 6B is a schematic view of a cross section taken along D-D in FIG. 1. As shown in FIG. 6A, the spot size converter 13 includes two multi-mode-thin-film-like cores 16, an optical waveguide core 14, and a cover layer 15. The multi-mode-thin-film-like core 16 and the optical waveguide core 14 are made of a material having a refractive index larger than that of the clad material 25. The cover layer 15 is made of a material having a refractive index lower than that of the clad material 25. The multi-mode-thin-film-like core 16 is made of a material having a refractive index lower than that of the optical waveguide core 14. The optical waveguide core 14 and the cover layer 15 are interposed between the multi-mode-thin-film-like core 16 in the vertical direction (Y direction), and the optical waveguide core 14 is interposed between the cover layers 15 in the vertical direction (Y direction).

Figure 12:
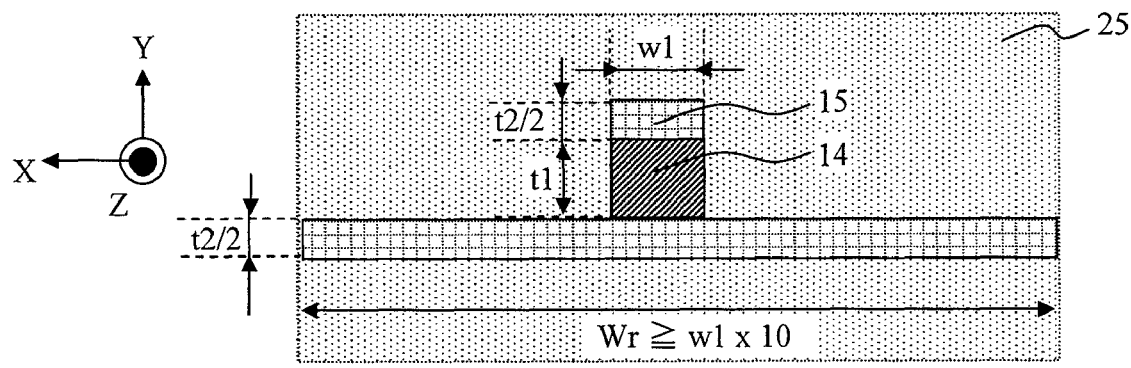
FIG. 12 is a drawing showing an example in which cover layers having different widths are provided on the upper layer and lower layer of the core.

Moreover, the shape of the spot size converter 13 viewed from the XZ plane is as shown in FIG. 6B. The shape of the two multi-mode-thin-film-like cores 16 is substantially rectangular. The shape of the optical waveguide core 14 is composed of a substantially rectangular shape and a tapered shape following the rectangular shape and having a width increasing toward the bottom of the magnetic head (trapezoid). The shape of the cover layer 15 viewed from the XZ plane is substantially the same shape as that of the optical waveguide core 14 in the example in the drawing. As shown in FIG. 12, one layer of the upper and lower cover layers may have substantially the same shape as that of the optical waveguide core 14, and another cover layer 15 may have a substantially rectangular shape. The length L2+L3 of the spot size converter 13 in the Z direction is equal to the length (L1) of the magnetic head, and 180 micrometers or 230 micrometers. Moreover, the length of the multi-mode-thin-film-like core 16 of the spot size converter 13 in the Z direction may not reach the bottom surface 17 of the magnetic head in order to avoid interference of the thin film coil 19 and the main pole 20.

The two multi-mode-thin-film-like cores 16 of the spot size converter 13 have a function to be coupled to the incident light 9 with high efficiency and propagate the light to the direction of the bottom surface of the magnetic head. The rectangular portion of the optical waveguide core 14 has a function to make the wavefront of the light that propagates flat. Moreover, the tapered portion of the optical waveguide core 14 has a function to reduce the spot size of the light. Moreover, the cover layer 15 has a function to couple the light that propagates through the multi-mode-thin-film-like core 16 to the optical waveguide core 14 with high efficiency.

In the present embodiment, the clad material 25 is $Al_2O_3$ having a refractive index of 1.57 to 1.66, the multi-mode-thin-film-like core 16 is $Al_2O_3$—$Si_3N_4$ having a refractive index of 1.74, the optical waveguide core 14 is $Ta_2O_5$ having a refractive index of 2.13, and the cover layer 15 is $SiO_2$ having a refractive index of 1.45. In the case where other clad material and core material are used, as long as the difference delta-n in the refractive index between the cores material and the clad material are the same, the properties of the optical waveguide (spot size converter is a kind of the optical waveguide) hardly change. For this reason, for example, $Al_2O_3$—$Si_3N_4$ can be used for the multi-mode-thin-film-like core 16, and $Si_3N_4$ (refractive index of 1.89 to 2.10) can be used for the optical waveguide e core 14, and $SiO_2$—$Si_3N_4$ can be used for the clad material 25. $Al_2O_3$—$Si_3N_4$ and $SiO_2$—$Si_3N_4$ are spattered by a sputtering method at the same time when $Al_2O_3$ or $SiO_2$ and $Si_3N_4$ are spattered. At this time, the film forming rate of $Al_2O_3$ or $SiO_2$ and the film forming rate of $Si_3N_4$ can be controlled to adjust the refractive index of $Al_2O_3$—$Si_3N_4$ in the range of 1.57 to 2.10 and the refractive index of $SiO_2$—$Si_3N_4$ in the range of 1.45 to 2.10.

Moreover, in the present embodiment, a core terminal width w2 of the termination of the spot size converter 13 is 0.5 micrometers or 0.6 micrometers, and a core terminal thickness t1 is 0.2 micrometers or 0.3 micrometers. As described above, the spot size converter 13 has a function to emit the light of the fine spot size to the magnetic recording medium. As described above, the spot size converter 13 can adjust the core terminal width w2 and the core terminal thickness t1, and can emit the light having a spot size of approximately 500 nm from the termination of the spot size converter 13 to the magnetic recording medium 3. In the case where the optical near-field transducer 18 is formed in the termination of the spot size converter 13, the width w2 and thickness t1 of the core having a high refractive index in the bottom surface of the magnetic head needs to be matched with the size of the optical near-field transducer (the width and the thickness both are not more than 0.5 micrometers). For this reason, the width w2 and the thickness t1 both may be not more than 0.5 micrometers.

As shown in FIG. 6B, the lower portion of the tapered portion in the core termination is extended. The reason why such a structure is provided is as follows. The main pole 20, the auxiliary magnetic pole 21, and the thin film coil 19 exist around the core termination of the magnetic head. For this reason, in the case where the light that seeps from and propagates around the core exists, the light is absorbed by the main pole 20, the auxiliary magnetic pole 21, or the thin film coil 19, which in turn may reduce the light transmission efficiency. Accordingly, with the structure as shown in FIG. 6B, the light that propagates around the main pole 20, the auxiliary magnetic pole 21, and the thin film coil 19 is enclosed within the core as much as possible, and thereby reduction in the light transmission efficiency can be suppressed.

The multi-mode-thin-film-like core 16 will be described in detail, which has a function to be coupled to the incident light 9 with high efficiency and propagate the light to the bottom surface of the magnetic head in the spot size converter 13 according to the present embodiment. The thickness t0 of the multi-mode-thin-film-like core 16 shown in FIG. 6A is set to be not larger than a thickness that can induce the seeping mode, and the multi-mode-thin-film-like core 16 is adjusted to be able to excite a first or higher-order optical waveguide mode. If the multi-mode-thin-film-like core 16 of the spot size converter 13 is thus adjusted, the spot size of the light that can be coupled to the multi-mode-thin-film-like core 16 and propagate therein can be increased. For this reason, the light can be light coupled to the incident light 9 having a large spot size shown in FIG. 1 with high efficiency to propagate the light to the direction of the bottom surface of the magnetic head.

A thickness Tt that can induce the seeping mode is approximately represented by the following equation, which is a transformation of a standing wave conditional expression of the zero-order mode within the optical waveguide:

$$Tt = \frac{\pi}{2\pi \cdot n_0 \cdot \sin\theta_1 / \lambda} \quad (1)$$

$\lambda$: wavelength of the light in vacuum
$n_0$: refractive index of the multi-mode-thin-film-like core wherein $\theta_1$ represents a critical angle of the light at an interface between the cores and the clad:

$$\theta_1 = \sin^{-1} \cdot \left( \frac{\sqrt{n_0^2 - n_2^2}}{n_0} \right) \quad (2)$$

$n_2$: refractive index of the clad material

Figure 7:
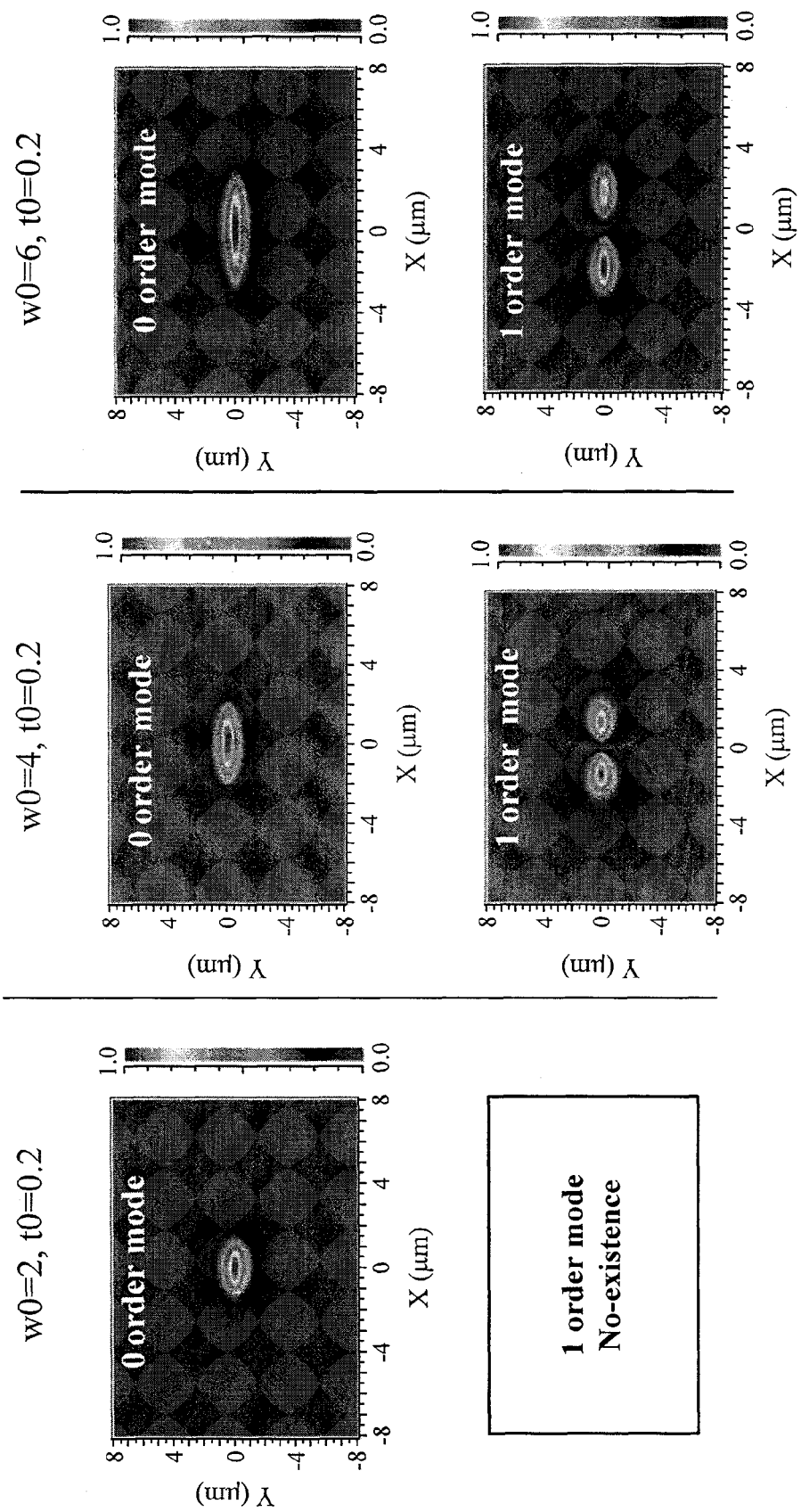
FIG. 7 is a drawing showing core width dependency of an optical waveguide mode profile excited by multi-mode-thin-film-like film core according to the present invention.

Moreover, when the thickness is set to be not larger than the thickness that can induce the seeping mode, the optical waveguide can excite the first or higher-order optical waveguide mode in the case where M1 approximately represented by the following equation is not less than 0.1:

$$M1 = \frac{w0 \cdot t0}{\lambda} \cdot (n_0 - n_2) \quad (3)$$

w0: core width (micrometers)
t0: core thickness (<Tt) (micrometers)
$\lambda$: wavelength of light in vacuum (micrometers)
$n_0$: refractive index of the core material
$n_2$: refractive index of the clad material Here, FIG. 7 shows the result of the spot intensity profile (optical propagation mode profile) of the light that can be coupled to one multi-mode-thin-film-like core 16 and propagate therein, the result being obtained by calculation using a beam propagation method (BPM) method. In the calculation, the optical propagation mode profile to the first order mode in each case of 4.0 micrometers and 6.0 micrometers wherein the thickness t0 of the multi-mode-thin-film-like core 16 is sufficiently thinner that the thickness Tt and 0.2 micrometers, and the wavelength of light is 830±20 nm, and w0=2.0 micrometers.

FIG. 7 shows that in the respective optical waveguide modes, the spot intensity profile size in the thickness direction (Y-axis direction) is sufficiently larger than the thickness of the core. Moreover, FIG. 7 shows that in the case where w0 is 4.0 micrometers and 6.0 micrometers at M1 of not less than 0.1 in the expression (3), the optical waveguide mode of the first or higher order is excited, optical propagation mode profile size of the first order optical waveguide mode is larger than the light propagation mode profile size of the zero-order optical waveguide mode.

Accordingly, in the multi-mode-thin-film-like core 16, the core thickness t0 is not larger than Tt, and the width w0, thickness t0, and refractive index of the core are adjusted such that M1 can be not less than 0.1 and the optical propagation mode of the first or higher order can be excited. Thereby, the spot size of the light that can be coupled to one multi-mode-thin-film-like core 16 can be increased.

Figure 8:
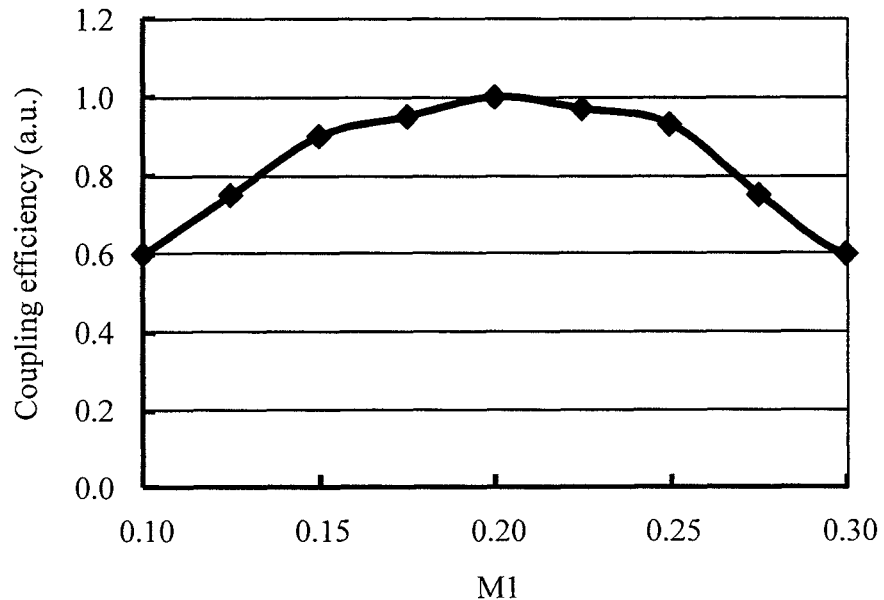
FIG. 8 is a drawing showing a relationship between light coupling efficiency of the multi-mode-thin-film-like film core and an M1 value.

Further, here, the result of calculation of the light coupling efficiency between the incident light 9 having a large spot size shown in FIG. 1 and the multi-mode-thin-film-like core 16 is shown in FIG. 8. The horizontal axis in FIG. 8 indicates M1 of the multi-mode-thin-film-like core, and the vertical axis indicates the light coupling efficiency between the incident light 9 and the multi-mode-thin-film-like core 16. In the drawing, normalization is performed wherein the efficiency in which the light coupling efficiency is the maximum is 1.0. The drawings shows that while the coupling efficiency rapidly falls at M1 of not more than 0.15, the coupling efficiency rapidly falls at M1 of not less than 2.5. Accordingly, in the multi-mode-thin-film-like core 16, the width w0, thickness t0, and refractive index $n_0$ of the core may be adjusted such that M1 of the core is 0.15 to 0.25, both inclusive. In the present embodiment, at a refractive index $n_2$ of the clad material 25 of 1.58, the refractive index of the core material of the multi-mode-thin-film-like core 16 is 1.66, the core thickness t0 is 0.3 micrometers, and the core width w0 is 6.0 micrometers. Moreover, at a refractive index $n_2$ of the clad material 25 of 1.63, the refractive index $n_0$ of the core material of the multi-mode-thin-film-like core 16 is 1.72, the core thickness t0 is 0.25 micrometers, and the core width w0 is 6.0 micrometers.

In the spot size converter 13 according to the present embodiment, the optical waveguide core 14 including the rectangular portion and the tapered portion, and the cover layer 15 including a material having a refractive index lower than that of the clad material 25 will be described in detail.

In the present embodiment, one or both of the width w1 and thickness t1 of the tip end of the optical waveguide core 14 in the upper portion of the spot size converter 13 shown in FIG. 6A and FIG. 6 are set at a size (Ww) in which the leak mode is obtained, and the optical waveguide core 14 is interposed between the cover layers 15. If the optical waveguide core 14 in the upper portion of the spot size converter 13 is thus adjusted, the difference delta-n in the refractive index between the optical waveguide core 14 and the clad 25 can be effectively reduced. For this reason, the spot size of the light that can be coupled to the optical waveguide core 14 and propagate therein. As a result, coupling to the light that propagated through the multi-mode-thin-film-like core 16 can be efficiently performed.

The width or thickness (Ww) that can induce the seeping mode is approximately represented by the following equation, which is a transformation of a standing wave conditional expression of the zero-order mode within the optical waveguide:

$$Ww = \frac{\pi}{2\pi \cdot n_1 \cdot \sin\theta_1 / \lambda} \quad (4)$$

$\lambda$: wavelength of the light in vacuum
$n_1$: refractive index of the core material
wherein $\theta_1$ represents a critical angle of the light at an interface between the cores and the clad:

$$\theta_1 = \sin^{-1} \cdot \left( \frac{\sqrt{n_1^2 - n_2^2}}{n_1} \right) \quad (5)$$

$n_2$: refractive index of the clad material

Figure 9:
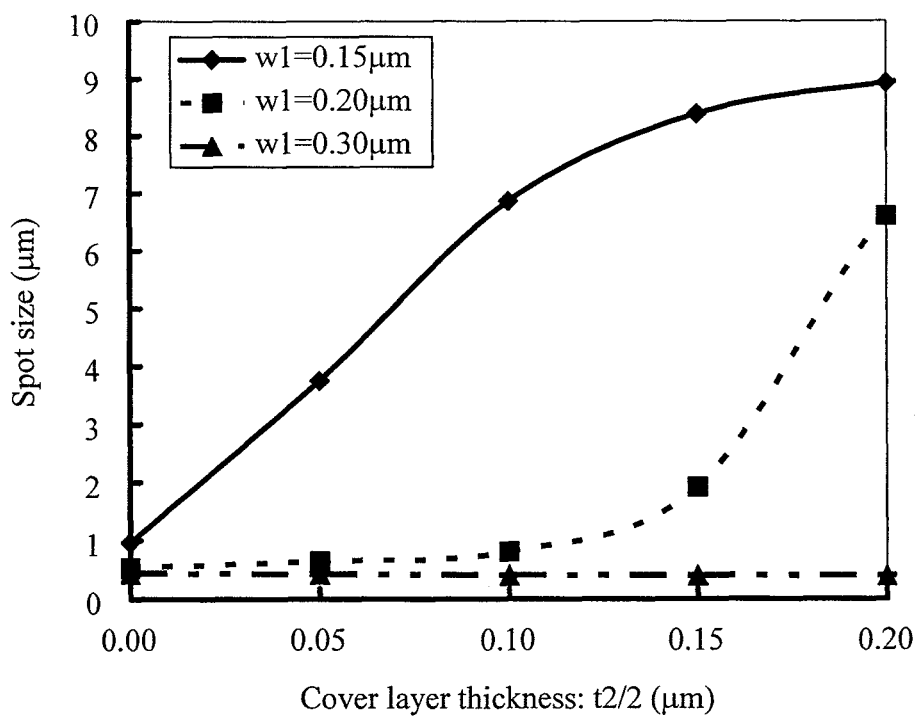
FIG. 9 is a drawing showing a relationship between the thickness of the cover layer and the spot size of the light that can be coupled to the tip end of a high refractive index core and propagate wherein a high refractive index core width is a parameter.

Here, FIG. 9 shows the result of spot size of the light that can be coupled to the tip end of the optical waveguide core 14 in the spot size converter 13 and propagate therein, the result being obtained by calculation using the BPM method. The horizontal axis in FIG. 9 indicates the thickness of the cover layer t2/2, and the vertical axis indicates the spot size of the light that can be coupled to the tip end of the core and propagate therein. The calculation is performed at w1=0.15 micrometers, 0.20 micrometers, and 0.30 micrometers wherein the width w1 of the optical waveguide core 14 has the same size as that of the thickness t1, the wavelength of light is 760±20 nm, and polarization is supposed to be circular polarization.

FIG. 9 shows that except that the case of w1=0.30 micrometers, the spot size is increased by providing the cover layer. The spot size is not increased at w1=0.30 micrometers. This is because the width w1 and the thickness t1 are larger than the width or thickness Tt that can induce the seeping mode, and the light is sufficiently enclosed within the optical waveguide core 14. In the present embodiment, the width Tt that can induce the seeping mode is approximately 290 nm.

Accordingly, in the present embodiment, one or both of the core width w1 and the core thickness t1 are not larger than 290 nm. At a wavelength of the light of 830±20 nm, from the equation for calculating Ww, one or both of the core width w1 and the core thickness t1 is not larger than 310 nm.

The thickness t2 of the cover layer 15 shown in FIG. 6A may be adjusted to a value Tc represented by the following equation or the like.

$$Tc = \frac{A \cdot t_1}{Ww} \quad (6)$$

wherein $$n_1 \cdot t_1 + n_3 \cdot A = n_2 \cdot (t_1 + A) \quad (7)$$

$n_1$: refractive index of the core material
$n_2$: refractive index of the clad material
$n_3$: refractive index of the cover layer
$t_1$: thickness of the core
Ww: width or thickness that can induce the seeping mode in the expression (4)

When t2 has the thickness Tc, the difference delta-n in a refractive index between the cores and the clad can be effectively 0, the spot size of the light that can be coupled to the tip end of the spot size converter 13 and propagate therein can be maximized. For this reason, as a result, coupling to the light that propagates through the multi-mode-thin-film-like core 16 can be effectively performed.

Figure 10:
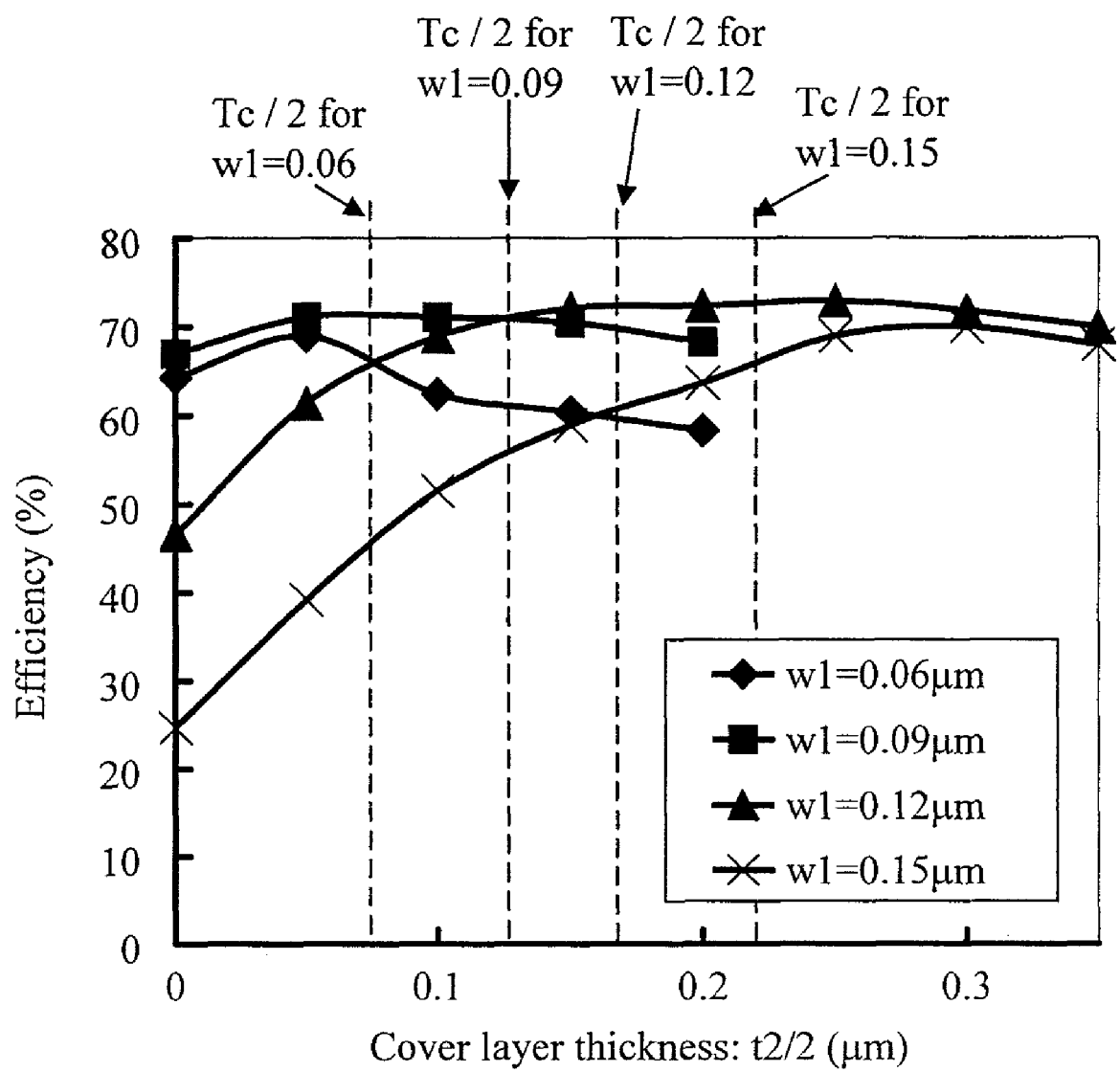
FIG. 10 is a drawing showing a relationship among the thickness of the cover layer, the core width, and the total optical propagation efficiency of the spot size converter.

Here, FIG. 10 shows the result of dependency of the total optical propagation efficiency of the spot size converter 13 on the thickness t2 of the cover layer, which is calculated by the BPM. The horizontal axis in FIG. 10 indicates the thickness t2/2 of the cover layer, and the vertical axis indicates the total optical propagation efficiency of the spot size converter (output light power from the incident light power/spot size converter). The calculation is performed at w1=0.06 micrometers, 0.09 micrometers, and 0.12 micrometers, 0.15 micrometers, wherein incident light to the spot size converter has a wavelength of 830±20 nm, polarization is linear polarization in the Y direction, the spot size is 5 micrometers, the thickness t1 of the optical waveguide core 14 in the spot size converter 13 shown in FIG. 6A and FIG. 6B is 0.2 micrometers, the length L2 is 0 micrometers (accordingly, L3=180 micrometers).

FIG. 10 shows that in the respective core widths w1, if the cover layer thickness t2 is the thickness in the range of approximately Tc±30% represented by the equation (6), the total optical propagation efficiency can be maximized. Accordingly, the cover layer thickness t2 may be the thickness in the range of approximately Tc±30% represented by the equation (6). In the present embodiment, at the core width w1 of 0.06 micrometer, the thickness t2/2 of the cover layer is 60 nm (wherein Tc/2=76 nm); at a core width w1 of 0.09 micrometers, the thickness of the cover layer t2/2 is 100 nm (wherein Tc/2=113 nm), at a core width w1 of 0.12 micrometers, the thickness of the cover layer t2/2 is 168 nm (wherein Tc/2=151 nm), or at a core width w1 of 0.15 micrometers, the thickness of the cover layer t2/2 is 210 nm (wherein Tc/2=189 nm).

Figure 11A:
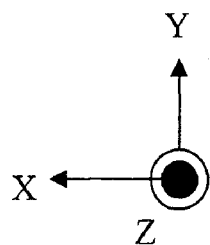
FIG. 11A is a drawing showing an example in which a cover layer is provided on both surfaces of the core.
Figure 11A:
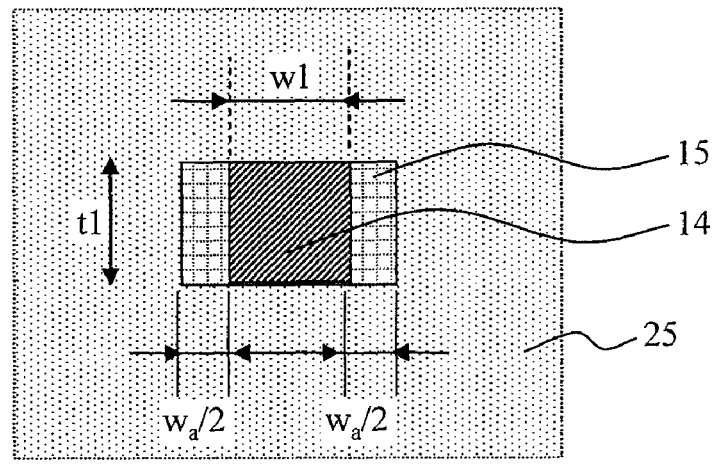
Figure 11B:
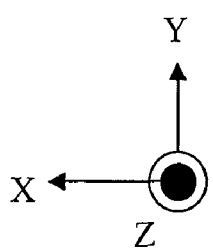
FIG. 11B is a drawing showing an example in which a cover layer is provided around the core.
Figure 11B:
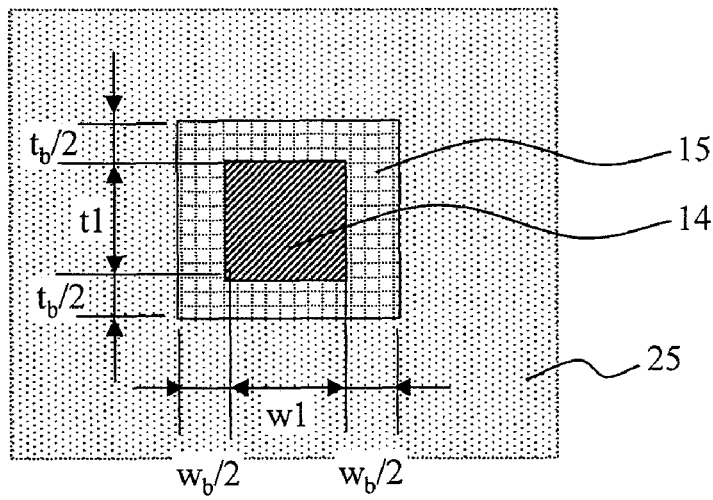

The cover layer 15 may be formed so as to be disposed on the both sides of the optical waveguide core 14 such that the optical waveguide core 14 is interposed between the cover layers as shown in FIG. 11A, or may be formed so as to be disposed on the upper and lower sides of the optical waveguide core 14 such that the optical waveguide core 14 is interposed between the cover layers as shown in FIG. 11B. In both cases, the same effect can be obtained. The optimal value of the thickness or width of the cover layer in the cases of FIG. 11A and FIG. 11B can be determined in the same manner when the cross section area of the cover layer is determined in the configuration in FIG. 6A. For example, in FIG. 6A and FIG. 6B, the cross section area of the cover layer is w1×t2 wherein a tip end width of the tapered portion is w1 and the optimal film thickness of the cover layer is t2. The thickness or width of the cover layer may be adjusted such that w1×t2 is equal to the cross section area of the cover layer in FIG. 11A and FIG. 11B (wa×t1 in FIG. 11A, and (wb+w1)×tb+t1×wb) in FIG. 11B).

Figure 14A:
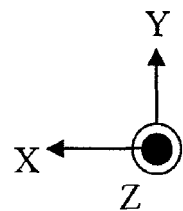
FIG. 14A is a drawing showing an example in which a cover layer is provided on only one side of the core in the Y direction.
Figure 14A:
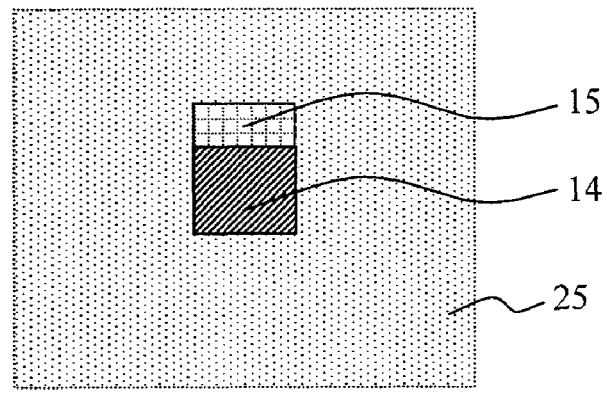
Figure 14B:
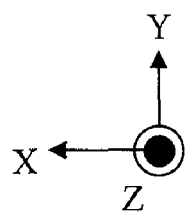
FIG. 14B is a drawing showing an example in which a cover layer is provided on only one side of the core in the X direction.
Figure 14B:
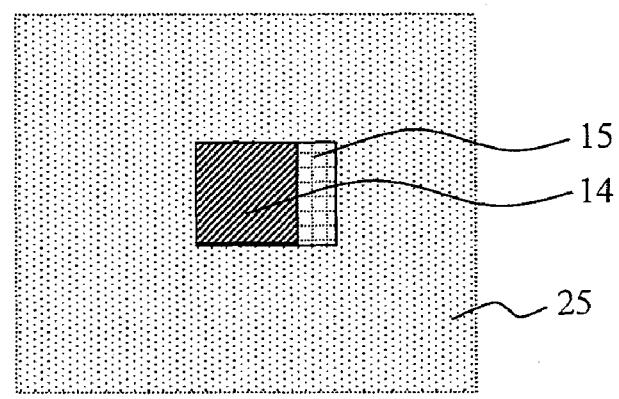

Moreover, as shown in FIG. 14A and FIG. 14B, the cover layer 15 may be formed only on one side of the optical waveguide core 14 without the optical waveguide core 14 being interposed therebetween. In this case, the same effect can also be obtained. As described above, the optimal value of the thickness or width of the cover layer in this case can be determined in the same manner when the cross section area of the cover layer is determined in the configuration in FIG. 6A and FIG. 6B.

The thickness or width of the cover layer shown in FIG. 11A and FIG. 11B may be different between the upper layer and the lower layer, or the left side and the right side. For example, as shown in FIG. 12, a cover layer having a width may be formed on the upper layer of the optical waveguide core 14, and a cover layer having a different width may be formed on the lower layer thereof.

Figure 13:
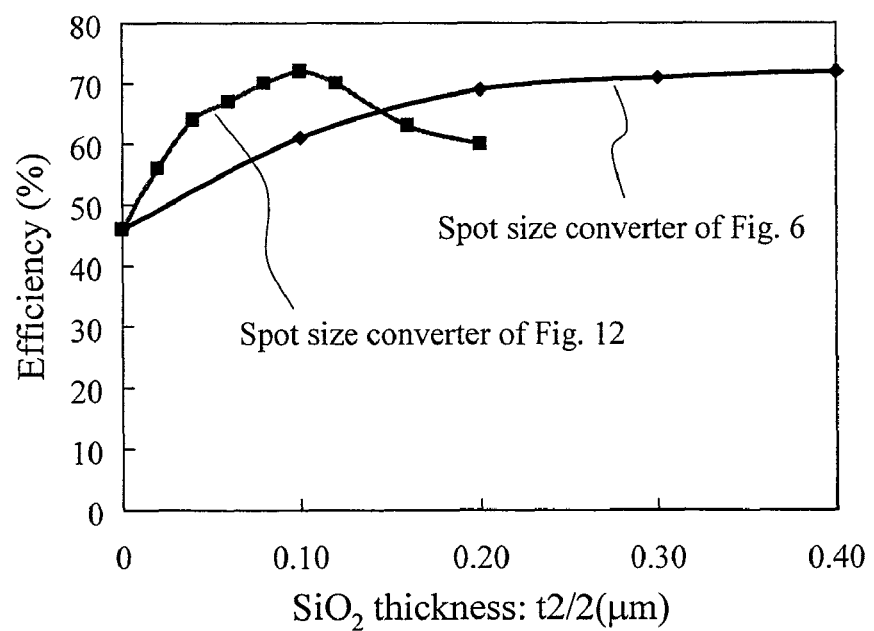
FIG. 13 is a drawing showing a relationship between the thickness of the cover layer and the total optical propagation efficiency in the spot size converters shown in FIG. 6 and FIG. 12.

Here, FIG. 13 shows the result of the dependency (t2/2) of the total optical propagation efficiency on the cover layer thickness calculated wherein the width of the cover layer on the upper layer is substantially equal to the tip end width w1 of the tapered portion, and the width wr of the cover layer on the lower layer is not smaller than 10 times the tip end width w1 of the tapered portion. The calculation is performed at w1=0.10 wherein the incident light to the spot size converter has a wavelength of 830±20 nm, polarization is linear polarization in the Y direction, the spot size is 5 micrometers, the thickness t1 of the optical waveguide core 14 in the spot size converter shown in FIG. 12 is 0.3 micrometers, and the length L2 is 0 micrometers (accordingly, L3=180 micrometers). For comparison, the dependency of the total optical propagation efficiency of the spot size converter shown in FIG. 6A and FIG. 6B on the cover layer thickness is calculated at the same time.

FIG. 13 shows that in the case of the example of the configuration shown in FIG. 12, the same total optical propagation efficiency can be obtained at a thickness t2/2 of the cover layer that is approximately ¼ of that in the example of the configuration shown in FIG. 6A and FIG. 6B. Accordingly, in the example of the configuration in FIG. 12 (in the case where the width wr of one of the cover layers is not smaller than 10 times the tip end width w1 of the tapered portion), the thickness may be approximately ¼ of the optimal thickness of the cover layer obtained in the example of the configuration in FIG. 6A and FIG. 6B. The thickness of the cover layer on the upper layer may be different from that on the lower layer shown in FIG. 12.

In the present embodiment, as shown in FIG. 6B, a substantially rectangular shape when viewed from the XZ plane (rectangular portion) is formed on the upper portion of the tapered portion. The wavefront of the light that is coupled to such a rectangular portion and propagates therein is made flat while the light reaches the tapered portion. For this reason, the loss to be produced when the spot size is reduced in the tapered portion can be suppressed.

Figure 15:
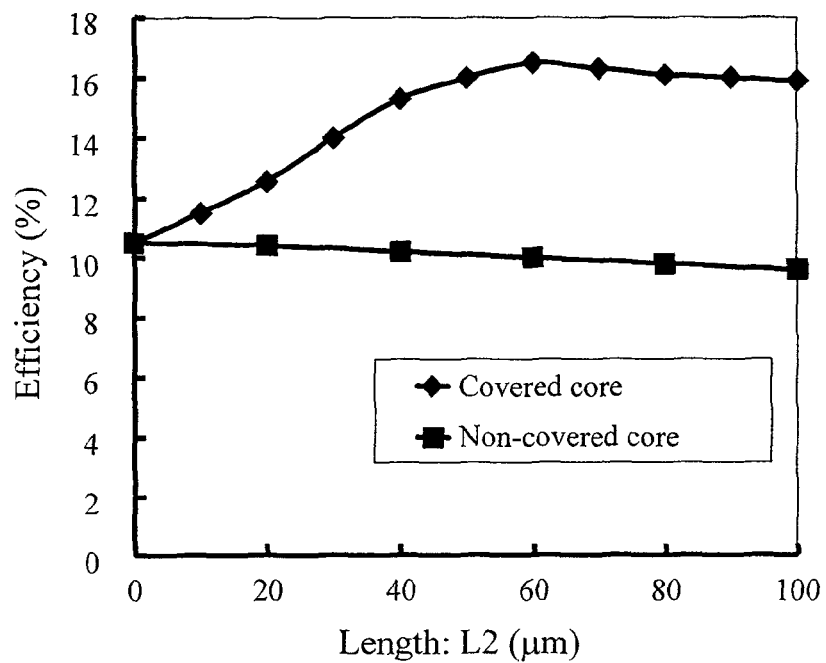
FIG. 15 is a drawing showing a relationship between the length of the rectangular portion and the total optical propagation efficiency in the spot size converter according to the present invention and a spot size converter without a over layer.

Here, FIG. 15 shows the results of the dependency of the total optical propagation efficiency of the spot size converter 13 on the length L2 of the rectangular portion, which is calculated by the BPM method. The horizontal axis in FIG. 15 indicates the length L2 of the rectangular portion, and the vertical axis indicates the total optical propagation efficiency of the spot size converter. In the calculation, as the incident light to the spot size converter, the light having a spot size of approximately 3 micrometers that freely propagates in the air (in the medium having a refractive index of 1) in a distance of 10 to 20 micrometers enters the spot size converter such that the wavefront of the light becomes spherical at the tip end of the spot size converter. The wavelength is 830±20 nm, and polarization is linear polarization in the Y direction. Moreover, at a core width w1 of 0.06 micrometers, the thickness of the cover layer t2/2 is 60 nm (wherein Tc/2=76 nm); at a core width w1 of 0.09 micrometers, the thickness of the cover layer t2/2 of 100 nm (wherein, Tc/2=113 nm); at a core width w1 of 0.12 micrometers, the thickness of the cover layer t2/2 is 168 nm (wherein Tc/2=151 nm); or at a core width w1 of 0.15 micrometers, the thickness t2/2 of the cover layer is 210 nm (wherein Tc/2=189 nm).

For comparison, the calculation is performed in the case of the spot size converter having only a core without a cover layer. The width w1 of the spot size converter having no cover layer is 0.06 micrometers such that the total optical propagation efficiency at L2=0 micrometers is the same efficiency as that in the spot size converter having the cover layer at L2=0 micrometers.

FIG. 15 shows that the total optical propagation efficiency is maximized at a length L2 of the rectangular portion of approximately 60 micrometers, is the efficiency approximately 1.6 times that in the case where no rectangular portion is provided. At L2 more than 60 micrometers, the efficiency is reduced. This is because if L2 is increased, length L3 of the tapered portion having a function to reduce the spot size is shorter, increasing the conversion loss of the spot size. Accordingly, if the length of the magnetic head is not limited, L2 may be not shorter than 60 micrometers. Moreover, it turns out that in the spot size converter having only the core without the cover layer, if the length L2 of the rectangular portion is increased, the efficiency is not increased but conversely is reduced. From this, it turns out that the effect of the rectangular portion making the wavefront flat does not function without the cover layer. From this, in the present embodiment, the length L2 of the rectangular portion is 60 micrometers.

Figure 16:
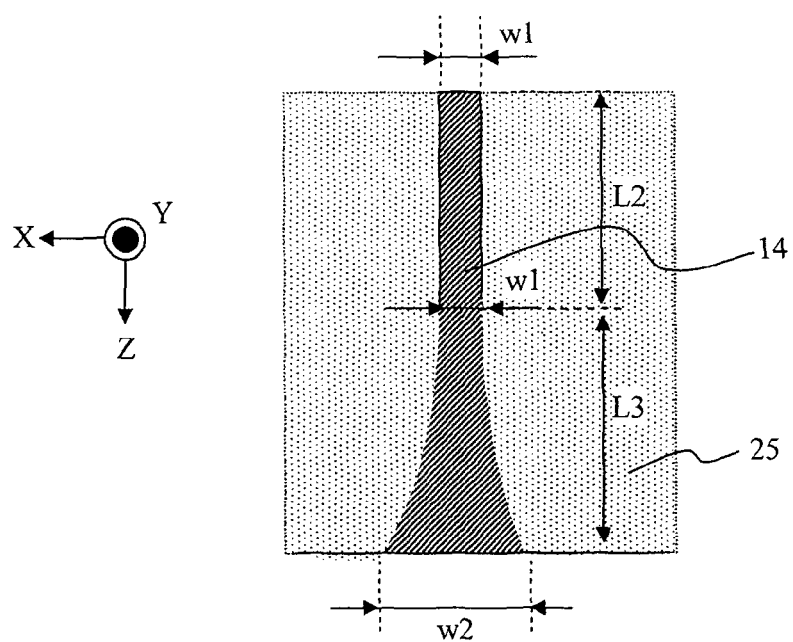
FIG. 16 is a drawing showing an example of a tapered portion extended toward the tip end quadratic-functionally.

The shape of the tapered portion is not limited to the trapezoid, and may be a shape as shown in FIG. 16 in which the width is quadratic-functionally increased toward the termination of the spot size converter. Further, the tapered portion may be a tapered shape as in FIG. 6B and FIG. 16 in which the thickness of the core is reduced toward the light entering side. In this case, the same effect can also be obtained. In this case, the thickness of the core is in the Y axis direction.

Disposition of the two multi-mode-thin-film-like cores 16 in the spot size converter 13 according to the present embodiment will be described in detail. In the present embodiment, the distance between the multi-mode-thin-film-like core 16 and the optical waveguide core 14 (Y direction) can be adjusted to improve the total optical propagation efficiency of the spot size converter 13. The principle will be described using FIG. 17A, FIG. 17B, FIG. 18A, and FIG. 18B.

Figure 17A:
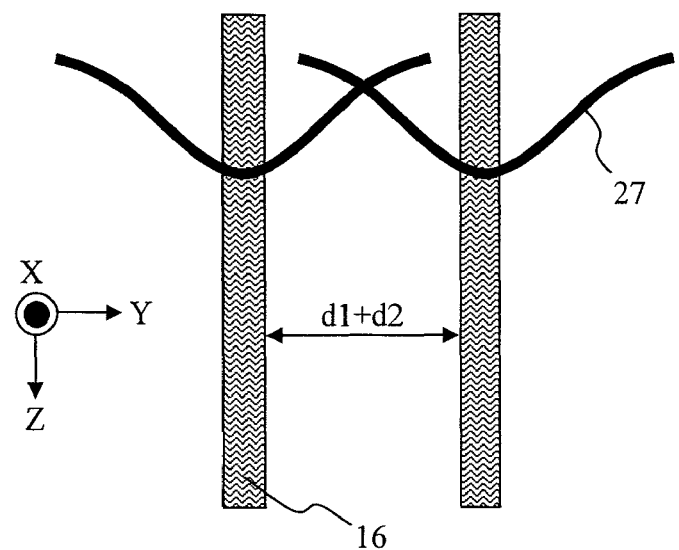
FIG. 17A is a conceptual diagram showing a state of intensity profile of the light that propagate through two multi-mode-thin-film-like film cores in the case where the distance between the multi-mode-thin-film-like cores is large.
Figure 17B:
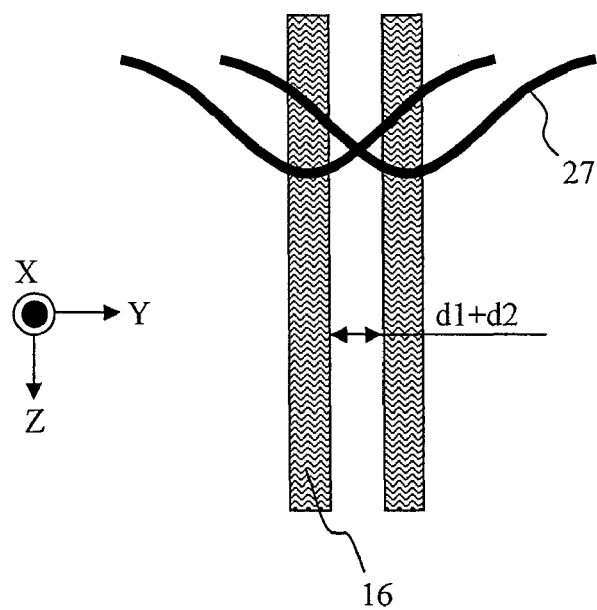
FIG. 17B is a conceptual diagram showing a state of intensity profile of the light that propagate through two multi-mode-thin-film-like cores in the case where the distance between the multi-mode-thin-film-like cores is small.

FIG. 17A and FIG. 17B are sectional views of the two thin film cores when viewed from the YZ plane, and schematic views for describing the state of the strength profile of the light (light spot) that propagates through the two multi-mode-thin-film-like cores 16 having the same shape. When the light enters the two multi-mode-thin-film-like cores 16, light spots 27 shown in the drawing propagate along the respective multi-mode-thin-film-like cores 16. In the case where an interval d1+d2 between the cores are smaller as shown in the FIG. 17B, the light spots 27 overlay each other to have approximately the same strength distribution as that of one light spot. For this reason, the coupling efficiency of the two multi-mode-thin-film-like cores 16 and the incident light is approximately the same as that in the case of the one multi-mode-thin-film-like core. However, if the interval d1+d2 is larger as shown in FIG. 17A, and the distance between the cores is sufficiently spaced, the light propagates in each of the two multi-mode-thin-film-like cores. For this, the coupling efficiency can be approximately 2 times that in the case where the interval d1+d2 is smaller.

However, as the interval d1+d2 becomes larger, the light coupling efficiency of the light that propagates in the two multi-mode-thin-film-like cores 16 and the optical waveguide core 14 is reduced. This is because a mismatch of the light that propagates in the two multi-mode-thin-film-like cores 16 and the intensity profile of the light that propagates around the optical waveguide core 14 is increased.

Figure 18A:
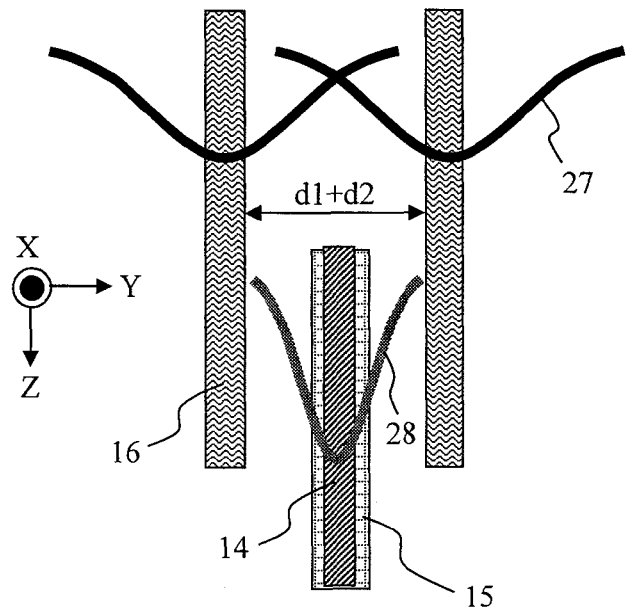
FIG. 18A is a conceptual diagram showing a state of light coupling between upper portions of the tapered portions of the multi-mode-thin-film-like core in the case where the distance between the multi-mode-thin-film-like cores is large.
Figure 18B:
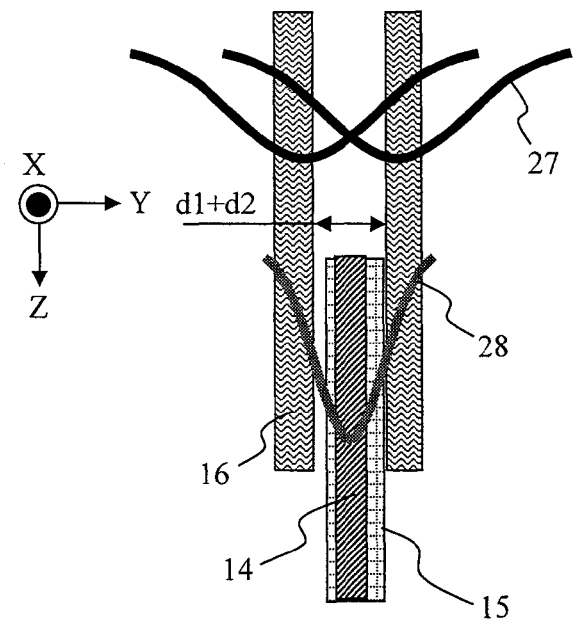
FIG. 18B is a conceptual diagram showing a state of light coupling between upper portions of the tapered portions of the multi-mode-thin-film-like core in the case where the distance between the multi-mode-thin-film-like cores is small.

FIG. 18A and FIG. 18B are sectional views of the spot size converter 13 when viewed from the YZ plane, and drawings schematically showing the state of the light that propagates in the multi-mode-thin-film-like core 16 and the light intensity profile of the light (light spot 28) that propagates in the upper portion of the optical waveguide cores 14. In the case where the interval d1+d2 between the cores is smaller as in FIG. 18B, the light 27 that propagates in the two multi-mode-thin-film-like cores 16 and the intensity profile of the light 28 that propagates in the upper portion of the optical waveguide core 14 are close. For this reason, the light is coupled to the optical waveguide core 14 with high efficiency. On the other hand, in the case where the interval d1+d2 between the cores is larger as in FIG. 18A, the difference in the intensity profile is large, and the coupling efficiency is reduced.

Figure 19:
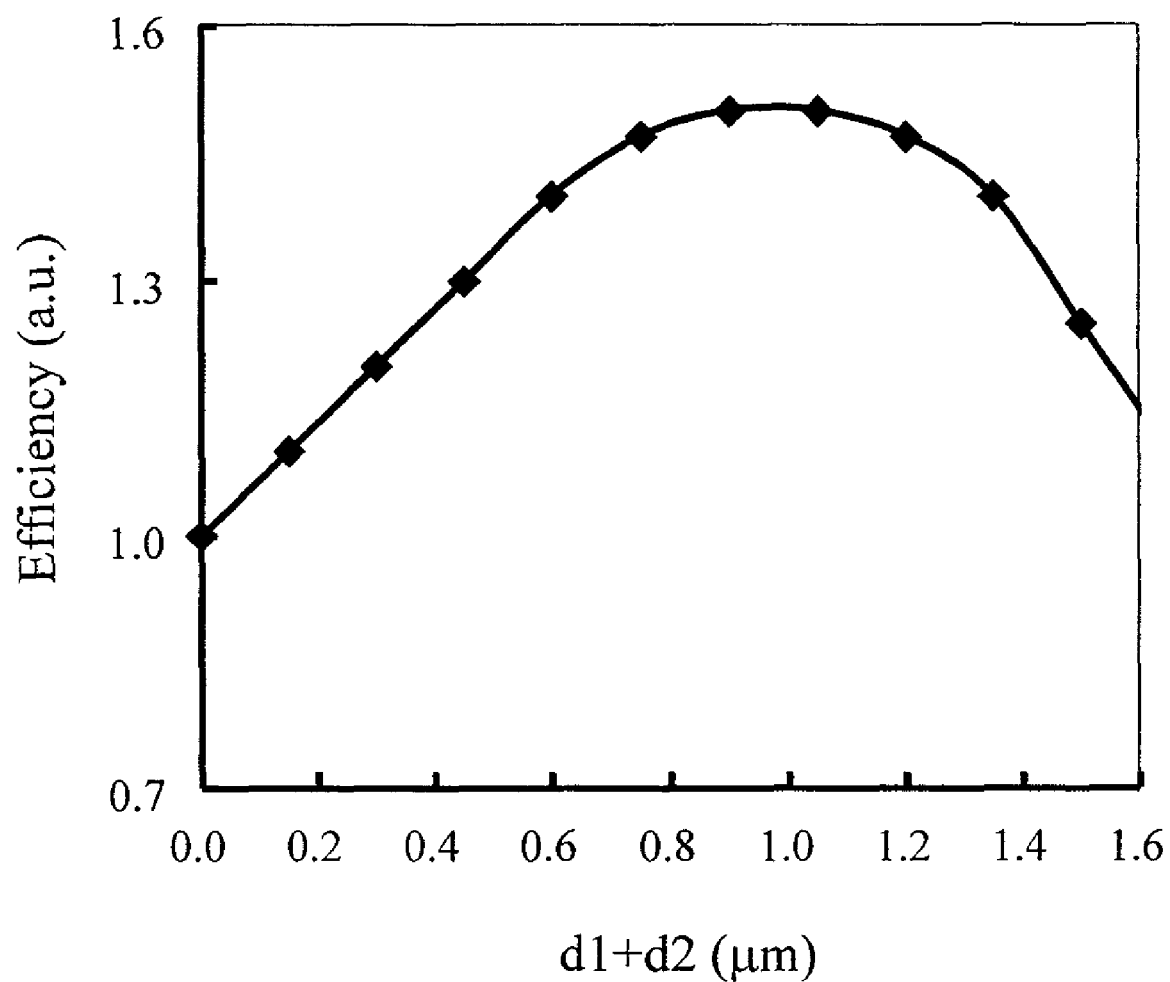
FIG. 19 is a drawing showing a relationship between an interval between two multi-mode-thin-film-like cores 16 and the total optical propagation efficiency.

Then, in order to obtain the maximum total optical propagation efficiency, using the BPM method, the relationship between the interval d1+d2 between two multi-mode-thin-film-like cores 16 and the total optical propagation efficiency is calculated. FIG. 19 shows the result of calculation. The total optical propagation efficiency in the vertical axis is normalized wherein the total optical propagation efficiency at an interval d1+d2 of 0 micrometers is 1. It turns out that at an interval d1+d2 of approximately 0.6 to 1.4 micrometers, the total optical propagation efficiency can be maximized. The half width of the spot size in the Y direction of the light in the zero-order mode that propagates along the multi-mode-thin-film-like core at this time is approximately 1.0 micrometer.

Accordingly, it turns out that d1+d2 at which the maximum total optical propagation efficiency is obtained is the value of half width of the spot size in the Y direction of the light in the zero-order mode that propagates along the thin film core 16±40%. Accordingly, the distance d1 (=d2) from the center of the optical waveguide core 14 to the multi-mode-thin-film-like core 16 may fall within the value of half width of the spot size in the Y direction of the light in the zero-order mode that propagates along the multi-mode-thin-film-like core 16±40%. Accordingly, in the present embodiment, the interval d1+d2 is 0.6 micrometers, 0.9 micrometers, or 1.3 micrometers. The half width of the spot size in the Y direction of the light that propagates around the thin film core can be derived using the BPM method if the width and thickness of multi-mode-thin-film-like core and delta-n are known.

In the present embodiment, the two multi-mode-thin-film-like cores 16 are substantially the same. The width and thickness and delta-n may be different between the respective thin film cores. In this case, d1 and d2 may fall within a half value of half width of the spot size in the Y direction of the light in the zero-order mode that propagates along the multi-mode-thin-film-like core±40%.

Figure 20:
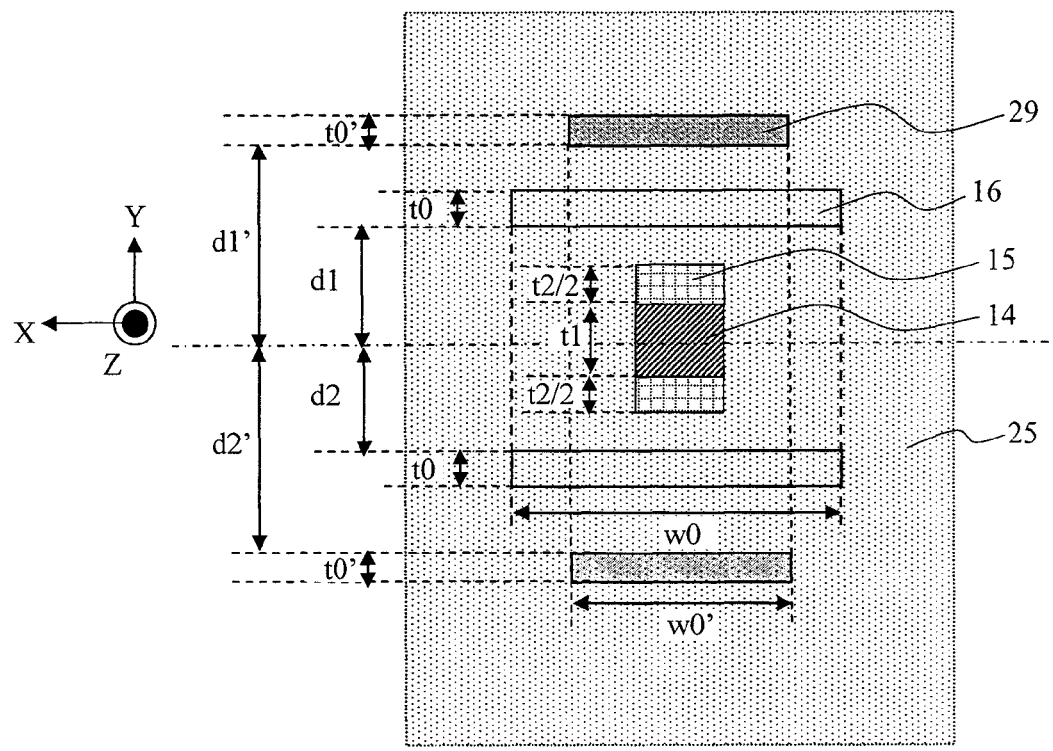
FIG. 20 is a drawing showing an example of a spot size converter having two or more multi-mode-thin-film-like cores.
Figure 21:
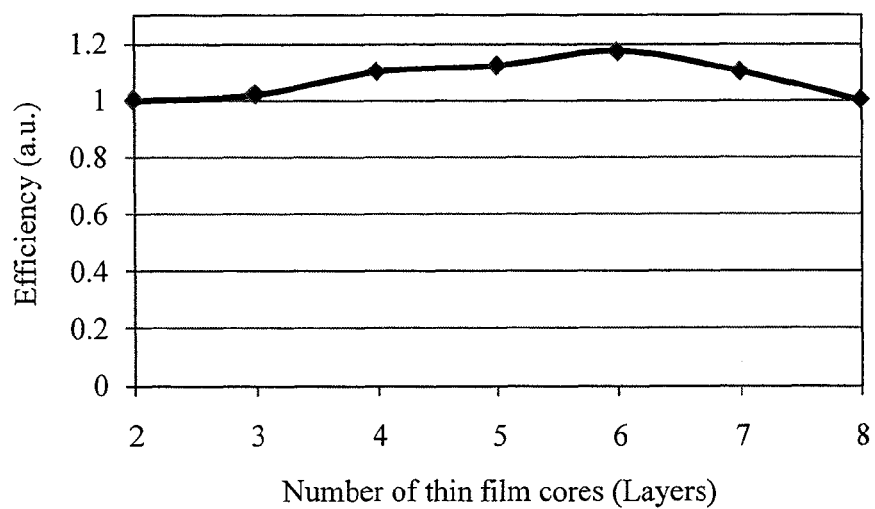
FIG. 21 is a drawing showing a relationship between the number of the multi-mode-thin-film-like cores and the total optical propagation efficiency in the spot size converter according to the present invention.

In the present embodiment, the multi-mode-thin-film-like core has two layers, but three or more layers may be provided as shown in FIG. 20. Thereby, even if the spot size of the incident light 9 is larger, the outer thin film core 29 can be coupled to the incident light. As a result, the total optical propagation efficiency of the spot size converter 13 can be improved. The distance d1' (=d2') from the center of the optical waveguide core 14 to the outer thin film core 29 may fall within the value of half width of the spot size in the Y direction of the light in the zero-order mode that propagates along the outer thin film core 29±40% similarly to the case of the distance d1 (=d2) from the center of the optical waveguide core 14 to the multi-mode-thin-film-like core 16. Moreover, one or both of the width and thickness of the outer thin film core 29 may be not larger than that (those) of the inner multi-mode-thin-film-like core 16. Moreover, the refractive index of the outer thin film core may be not larger than that of the inner multi-mode-thin-film-like core 16. If one or both of the width and thickness of the multi-mode-thin-film-like core are reduced or the refractive index thereof is reduced, an effective refractive index of the optical waveguide made of the multi-mode-thin-film-like core can be reduced. The light tries to advance to a higher refractive index side as a basic property. For this, the light coupled to the outer thin film core 29 having a small effective refractive index is easy to couple to the inner multi-mode-thin-film-like core 16 and the optical waveguide core 14 having an effective refractive index larger than that of the outer thin film core 29. As a result, the total optical propagation efficiency of the spot size converter 13 can be improved. Here, FIG. 21 shows the result of calculation of the dependency of the total optical propagation efficiency of the spot size converter on the number of the thin film cores, which is calculated by the BPM method. The total optical propagation efficiency is normalized wherein the number of the multi-mode-thin-film-like cores is two. The width or thickness of the outer thin film core at this time is not larger than the width or thickness of the inner multi-mode-thin-film-like core. The distance from the center of the optical waveguide core 14 to the outer thin film core falls within the value of half width of the spot size in the Y direction of the light in the zero-order mode that propagates in the outer thin film core±40%. FIG. 21 shows that if the number of the thin film cores is not less than 7, improvement in the total optical propagation efficiency is conversely reduced. Accordingly, the number of the thin film cores may be not more than 6.

The present invention is not limited to the embodiments above, and various modifications are included. For example, the embodiments above are intended to describe the present invention in detail for understanding, and not limited to those having all the configurations described above. Moreover, part of the configuration in one embodiment can be replaced by a configuration in other embodiment. Moreover, a configuration in other embodiment can be added to the configuration in one embodiment. Moreover, in part of the configurations in the respective embodiments, addition and deletion of other configuration and replacement by other configuration are possible.

EXPLANATION OF REFERENCE NUMERALS

1 Casing
2 Spindle
3 Magnetic recording medium
4 Optical source
5 Magnetic head
6 Suspension
7 Voice coil motor
8 LSI for signal processing
9 Incident light
10 Semiconductor laser
11 Submount
12 Active layer
13 Spot size converter
14 optical waveguide core
15 Cover layer
16 multi-mode-thin-film-like core
17 Bottom surface of magnetic head
18 Optical near-field transducer
19 Thin film coil
20 Main pole
21 Auxiliary magnetic pole
22 Magnetic read element
23 Shield
24 Magnetic head base material
25 Clad material
26 Light intensity profile
27 Light spot that propagates in multi-mode-thin-film-like core
28 Light spot that propagates core
29 Outer thin film core

What is claimed is:

1. A thermally assisted recording magnetic head, comprising:
    a main pole that generates a write magnetic field;
    an auxiliary magnetic pole;
    a magnetic read element;
    a shield formed around the magnetic read element; and
    a spot size converter, including:
        a clad,
        an optical waveguide core that guides light from an optical source as a fine light spot to a position adjacent to the main pole on an air bearing surface side,
        wherein the spot size converter has a multi-mode-thin-film-like core that guides the light from the optical source into the magnetic head, and
        a cover layer having a refractive index lower than that of the clad is formed on an outer periphery of the optical waveguide core;
        wherein the optical waveguide core has a first portion, wherein width and thickness do not substantially change in a light traveling direction, and a second portion, that is tapered, wherein at least one of width and thickness is increased in the light traveling direction.

2. The thermally assisted recording magnetic head according to claim 1, wherein
    the multi-mode-thin-film-like core has a thickness not larger than a thickness that induces a seeping mode, and is adjusted in width and refractive index so as to be able to excite a light waveguide mode.

3. The thermally assisted recording magnetic head according to claim 1, wherein
    the optical waveguide core having the cover layer formed is interposed between a pair of the multi-mode-thin-film-like cores.

4. The thermally assisted recording magnetic head according to claim 1, wherein
    one or both of the width and thickness of the optical waveguide core are not larger than those that induce a seeping mode.

5. The thermally assisted recording magnetic head according to claim 1, wherein
    the thermally assisted recording magnetic head comprises a plurality of the multi-mode-thin-film-like cores, and
    a distance between adjacent multi-mode-thin-film-like cores is from −40% to +40% of a half value of a half width of the spot size of the light in a zero-order light waveguide mode that propagates in each of the multi-mode-thin-film-like cores.

6. The thermally assisted recording magnetic head according to claim 1, wherein
    the magnetic head has an optical near-field transducer on the air bearing surface side.

7. A magnetic recording apparatus comprising:
    a magnetic recording medium;
    a medium driving unit that drives the magnetic recording medium;
    a magnetic head having a recording element and a read element; and
    a magnetic head driving unit that positions the magnetic head above the magnetic recording medium;
    wherein the magnetic head includes a main pole that generates a write magnetic field, an auxiliary magnetic pole, a magnetic read element, a shield formed around a magnetic read element, and a spot size converter including a clad and an optical waveguide core that guides light from an optical source as a fine light spot to a position adjacent to the main pole on an air bearing surface side;

wherein the spot size converter includes a multi-mode-thin-film-like core that guides the light from the optical source to the magnetic head, and a cover layer having a refractive index lower than that of the clad is formed on an outer periphery of the optical waveguide core; and wherein the optical waveguide core has a first portion, wherein width and thickness do not substantially change in a light traveling direction, and a second portion, that is tapered, wherein at least one of width and thickness is increased in the light traveling direction.

8. The magnetic recording apparatus according to claim 7, wherein
the multi-mode-thin-film-like core has a thickness not larger than a thickness that induces a seeping mode, and is adjusted in width and refractive index so as to be able to excite a light waveguide mode.

9. The magnetic recording apparatus according to claim 7, wherein
the optical waveguide core having the cover layer formed is interposed between a pair of the multi-mode-thin-film-like cores.

10. The magnetic recording apparatus according to claim 7, wherein
one or both of the width and thickness of the optical waveguide core are not larger than those that induce a seeping mode.

11. The magnetic recording apparatus according to claim 7, wherein
the thermally assisted recording magnetic head comprises a plurality of the multi-mode-thin-film-like cores, and a distance between adjacent multi-mode-thin-film-like cores is from −40% to +40% of a half value of a half width of the spot size of the light in a zero-order light waveguide mode that propagates in each of the multi-mode-thin-film-like cores.

12. The magnetic recording apparatus according to claim 7, wherein
the magnetic head has an optical near-field transducer on the air bearing surface side.

13. A thermally assisted recording magnetic head, comprising:
a main pole that generates a write magnetic field;
an auxiliary magnetic pole;
a magnetic read element;
a shield formed around the magnetic read element; and
a spot size converter, including:
a clad,
an optical waveguide core that guides light from an optical source as a fine light spot to a position adjacent to the main pole on an air bearing surface side,
wherein the spot size converter has a multi-mode-thin-film-like core that guides the light from the optical source into the magnetic head, and
a cover layer having a refractive index lower than that of the clad is formed on an outer periphery of the optical waveguide core;
wherein the thermally assisted recording magnetic head comprises a plurality of the multi-mode-thin-film-like cores; and
wherein a distance between adjacent multi-mode-thin-film-like cores is from −40% to +40% of a half value of a half width of the spot size of the light in a zero-order light waveguide mode that propagates in each of the multi-mode-thin-film-like cores.

* * * * *